United States Patent
Grabarnik et al.

(10) Patent No.: US 12,105,279 B2
(45) Date of Patent: Oct. 1, 2024

(54) DISPLAYS EMPLOYING ASTIGMATIC OPTICS AND ABERRATION COMPENSATION

(71) Applicant: Lumus Ltd., Ness Ziona (IL)

(72) Inventors: Shimon Grabarnik, Rechovot (IL); Tsion Eisenfeld, Ashkelon (IL); Eitan Ronen, Rechovot (IL); Ronen Chriki, Lod (IL)

(73) Assignee: LUMUS LTD., Ness Ziona (IL)

( * ) Notice: Subject to any disclaimer, the term of this patent is extended or adjusted under 35 U.S.C. 154(b) by 690 days.

(21) Appl. No.: 17/427,963

(22) PCT Filed: Oct. 25, 2020

(86) PCT No.: PCT/IL2020/051114
§ 371 (c)(1),
(2) Date: Aug. 3, 2021

(87) PCT Pub. No.: WO2021/079372
PCT Pub. Date: Apr. 29, 2021

(65) Prior Publication Data
US 2022/0091413 A1 Mar. 24, 2022

(51) Int. Cl.
*G02B 27/00* (2006.01)
*G02B 3/00* (2006.01)
(Continued)

(52) U.S. Cl.
CPC ....... *G02B 27/0081* (2013.01); *G02B 3/0056* (2013.01); *G02B 3/06* (2013.01);
(Continued)

(58) Field of Classification Search
CPC ............ G02B 27/0081; G02B 27/0172; G02B 27/285; G02B 2027/011; G02B 3/0056
(Continued)

(56) References Cited

U.S. PATENT DOCUMENTS

| 5,870,159 A | 2/1999 | Sharp |
| 7,643,214 B2 | 1/2010 | Amitai |

(Continued)

FOREIGN PATENT DOCUMENTS

| CN | 104570353 | 4/2015 |
| CN | 108107579 | 2/2021 |

(Continued)

OTHER PUBLICATIONS

Jianming Yang et al, "Design of a large field-of-view see-through near to eye display with two geometrical waveguides", Optics Letters, US, (Nov. 16, 2016), vol. 41, No. 23, doi:10.1364/OL.41.005426, ISSN 0146-9592, p. 5426, XP055383187 [Y] 1-3,8-22 * p. 5427; figures 1,2 * http://dx.doi.org/10.1364/OL.41.005426.

(Continued)

*Primary Examiner* — Joseph P Martinez
*Assistant Examiner* — Grant A Gagnon
(74) *Attorney, Agent, or Firm* — Rivka Friedman

(57) ABSTRACT

A display for providing an image to an eye of an observer is disclosed. An image generator provides image illumination corresponding to the image to a substrate having mutually-parallel major external surfaces for propagation within the substrate. An intermediate optical arrangement including at least one astigmatic optical element directs the image illumination from the image generator so as to propagate within the substrate in a first in-plane direction by internal reflection. A reflective optical arrangement having cylindrical optical power reflects the image illumination so as to propagate in a second in-plane direction by internal reflection. A coupling-out arrangement couples out the collimated image illumination towards an eye of an observer. The intermediate optical arrangement includes an element deployed to generate a corrective optical aberration that at least partially (Continued)

cancels out with a characteristic aberration introduced by the reflective optical arrangement.

22 Claims, 39 Drawing Sheets

(51) Int. Cl.
 *G02B 3/06* (2006.01)
 *G02B 27/01* (2006.01)
 *G02B 27/28* (2006.01)
(52) U.S. Cl.
 CPC ....... *G02B 27/0172* (2013.01); *G02B 27/285* (2013.01); *G02B 2027/011* (2013.01)
(58) Field of Classification Search
 USPC .......................................................... 359/629
 See application file for complete search history.

(56) References Cited

U.S. PATENT DOCUMENTS

| | | | |
|---|---|---|---|
| 9,377,623 | B2 | 6/2016 | Robbins et al. |
| 9,494,799 | B2 | 11/2016 | Robbins et al. |
| 10,168,531 | B1 | 1/2019 | Trail et al. |
| 10,209,517 | B2 | 2/2019 | Popovich et al. |
| 10,423,837 | B2 | 9/2019 | Vaziri |
| 10,551,622 | B2 | 2/2020 | Robbins et al. |
| 10,816,809 | B2 | 10/2020 | Kim et al. |
| 11,327,312 | B2 | 5/2022 | Robaina et al. |
| 2013/0077049 | A1 | 3/2013 | Bohn |
| 2014/0036361 | A1 | 2/2014 | Woodgate et al. |
| 2014/0098010 | A1 | 4/2014 | Travis |
| 2015/0185475 | A1 | 7/2015 | Saarikko et al. |
| 2015/0205126 | A1 | 7/2015 | Schowengerdt |
| 2015/0289762 | A1 | 10/2015 | Popovich et al. |
| 2015/0378515 | A1 | 12/2015 | Robbins et al. |
| 2016/0085300 | A1 | 3/2016 | Robbins et al. |
| 2016/0025393 | A1 | 9/2016 | Rockwell |
| 2018/0045960 | A1 | 2/2018 | Palacios et al. |
| 2018/0188631 | A1 | 7/2018 | Lu et al. |
| 2018/0232048 | A1 | 8/2018 | Popovich et al. |
| 2018/0246336 | A1 | 8/2018 | Greenberg |
| 2018/0284440 | A1 | 10/2018 | Popovich et al. |
| 2018/0284884 | A1 | 10/2018 | Sulai et al. |
| 2018/0292592 | A1 | 10/2018 | Danziger |
| 2018/0033562 | A1 | 11/2018 | Cheng et al. |
| 2019/0026864 | A1 | 1/2019 | Chen et al. |
| 2019/0033598 | A1 | 1/2019 | Yang et al. |
| 2019/0056600 | A1 | 2/2019 | Danziger et al. |
| 2019/0018748 | A1 | 6/2019 | Shani et al. |
| 2019/0171285 | A1 | 6/2019 | Sulai et al. |
| 2019/0187482 | A1 | 6/2019 | Lanman |
| 2020/0089319 | A1 | 3/2020 | Popovich et al. |
| 2020/0117006 | A1 | 4/2020 | Kollin et al. |
| 2020/0233214 | A1 | 7/2020 | Jia et al. |
| 2020/0333606 | A1 | 10/2020 | Popovich et al. |
| 2020/0341269 | A1 | 10/2020 | Mills et al. |
| 2021/0033872 | A1 | 2/2021 | Rubin et al. |
| 2021/0247613 | A1 | 8/2021 | Hudman |

FOREIGN PATENT DOCUMENTS

| | | |
|---|---|---|
| EP | 3839607 | 6/2021 |
| JP | S61140925 | 6/1986 |
| WO | 2021/124315 | 6/2021 |

OTHER PUBLICATIONS

Yang Jianming et al, "Polychromatic see-through near-eye display design with two waveguides and a large field-of-view", Proceedings of SPIE; [Proceedings of SPIE ISSN 0277-786X vol. 10524], SPIE, US, (Apr. 29, 2016), vol. 9896, doi:10.1117/12.2227383, ISBN 978-1-5106-1533-5, pp. 989605-989605, XP060071032 [A] 1-22 * figure 1 * * 2.1 Geometry of the system *http://dx.doi.org/10.1117/12.2227383.

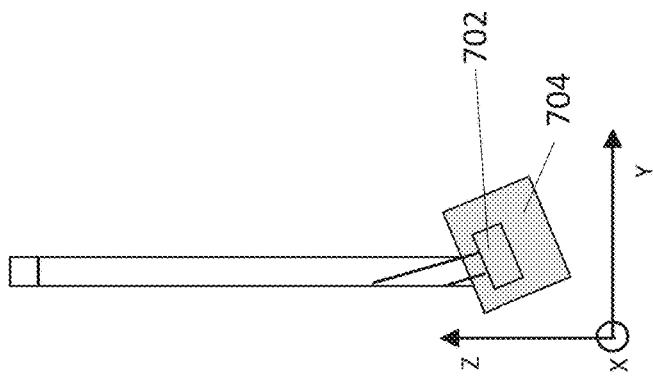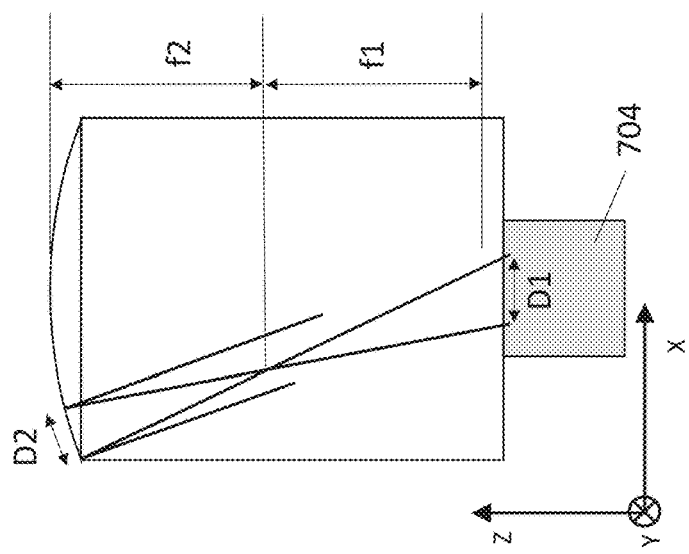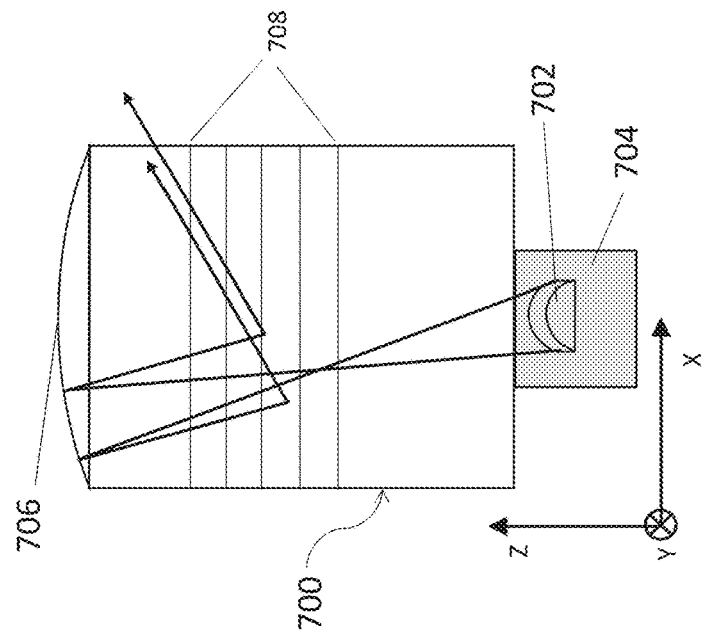

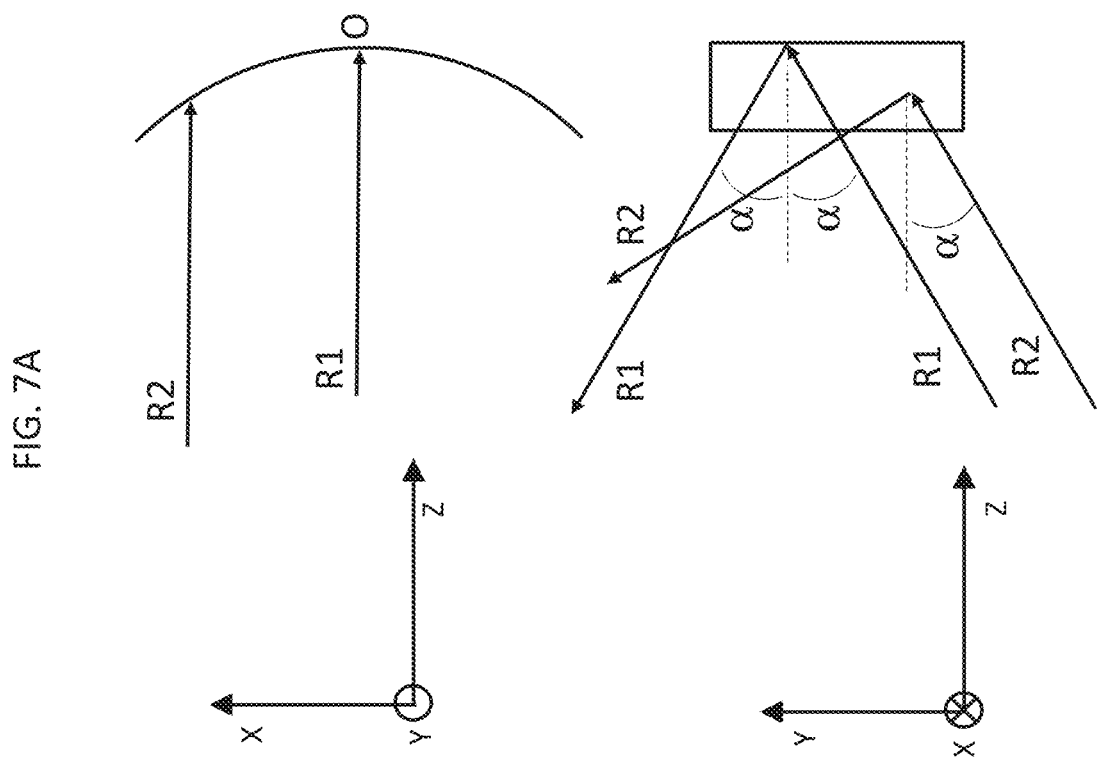

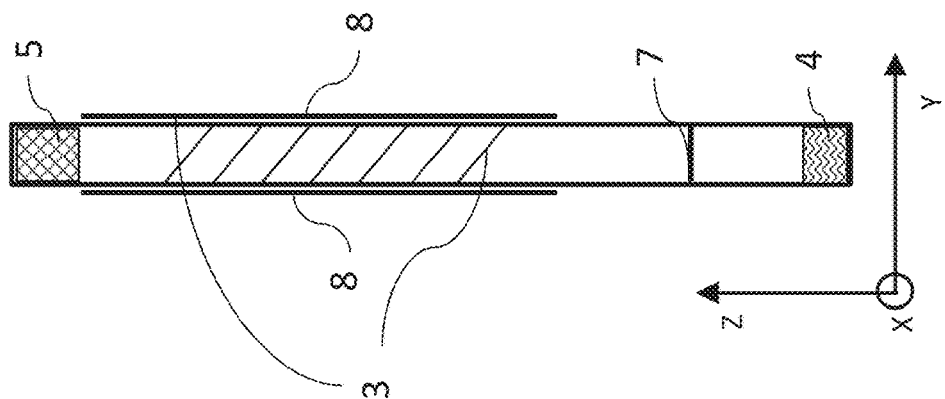
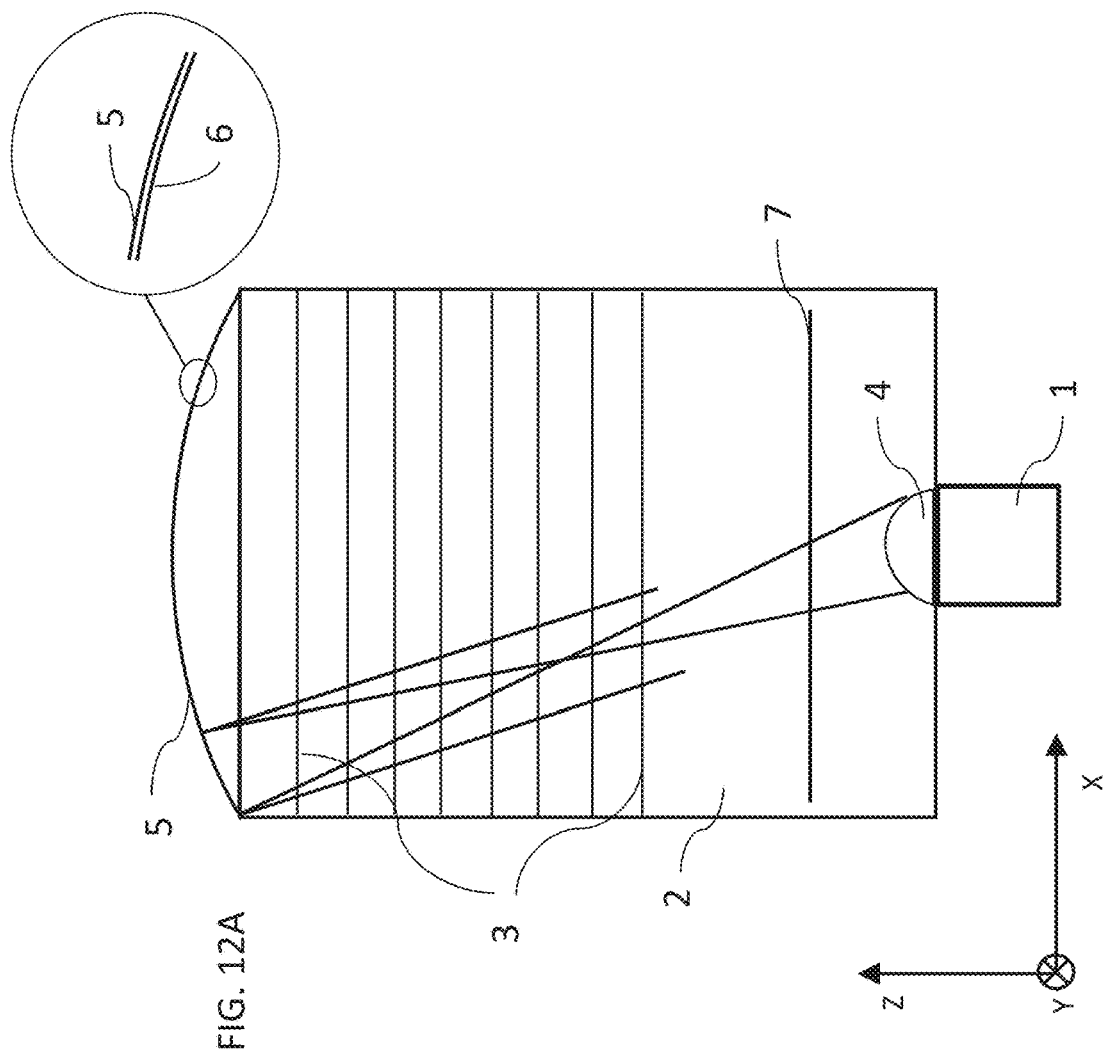

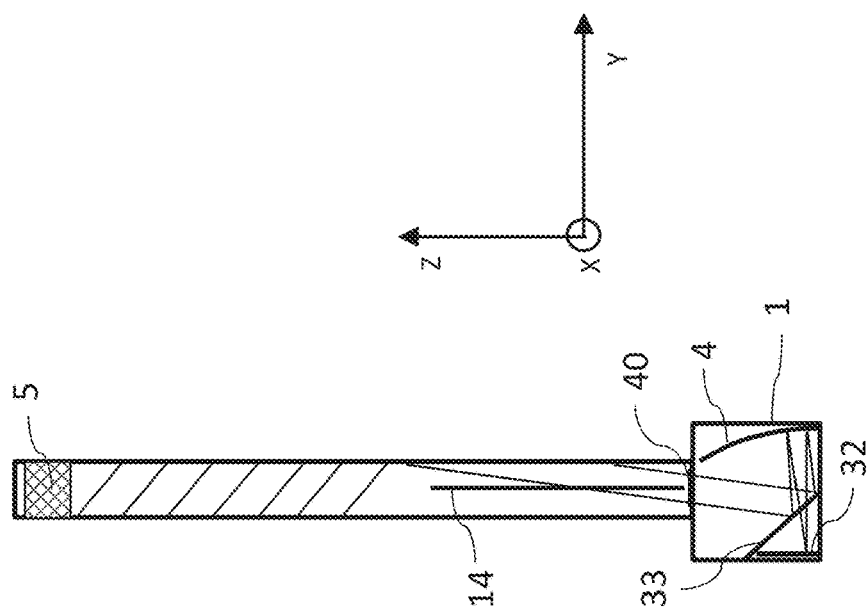
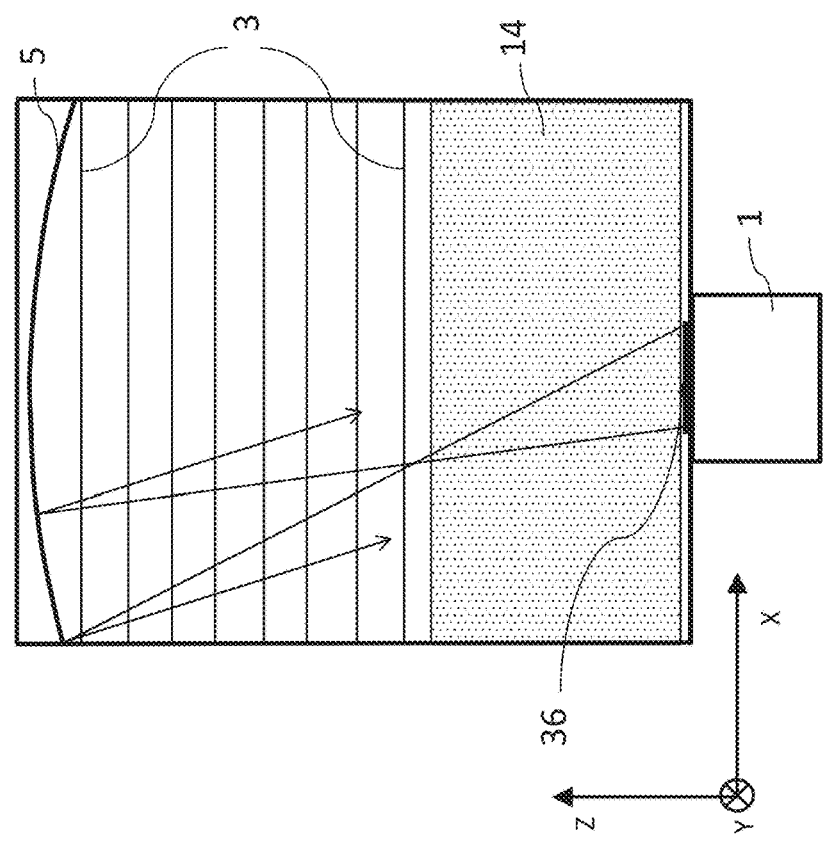

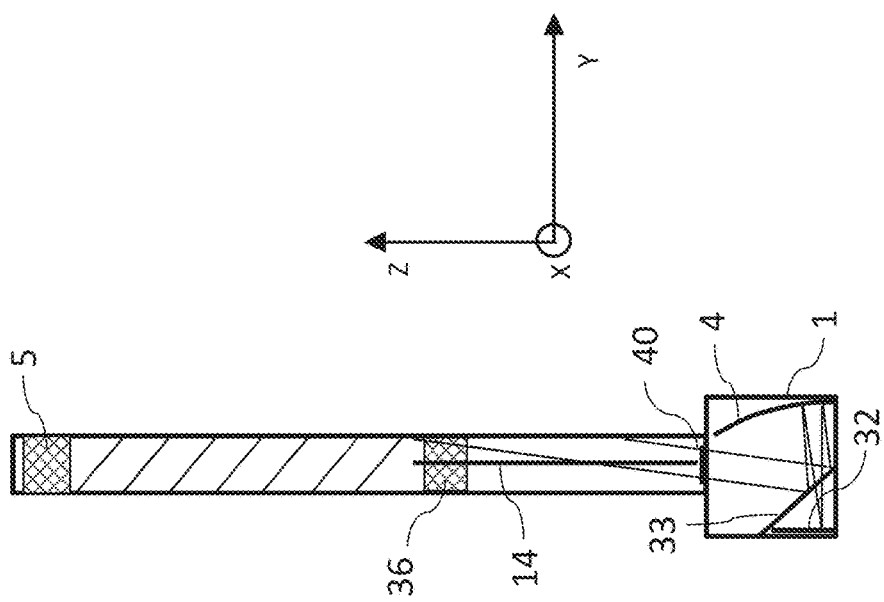
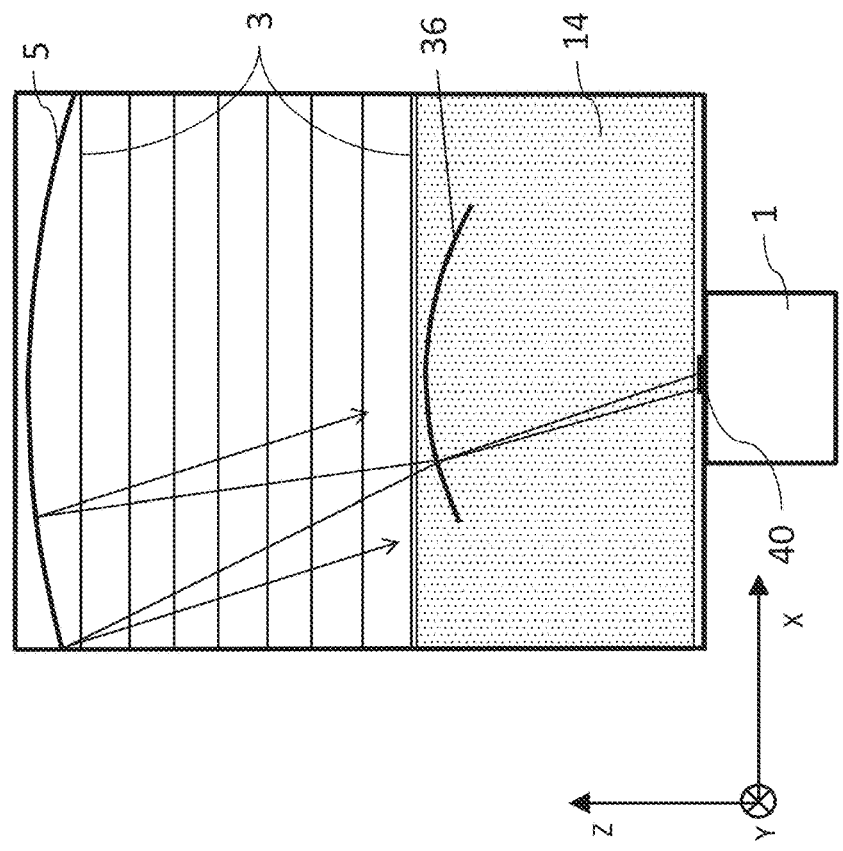

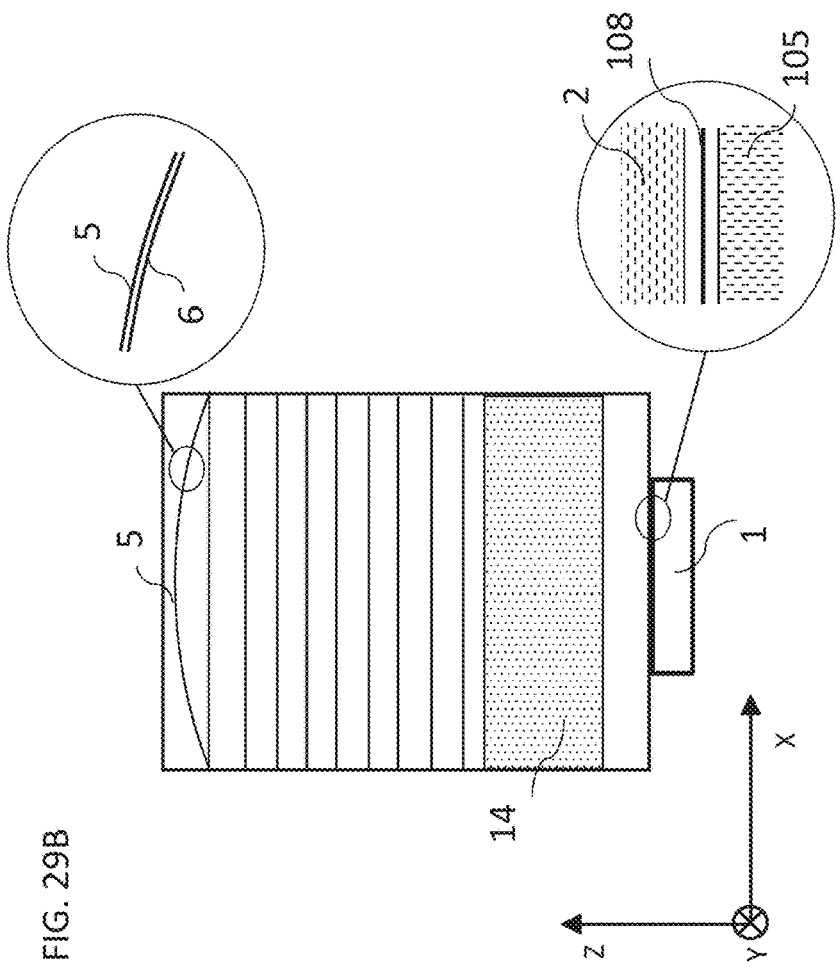
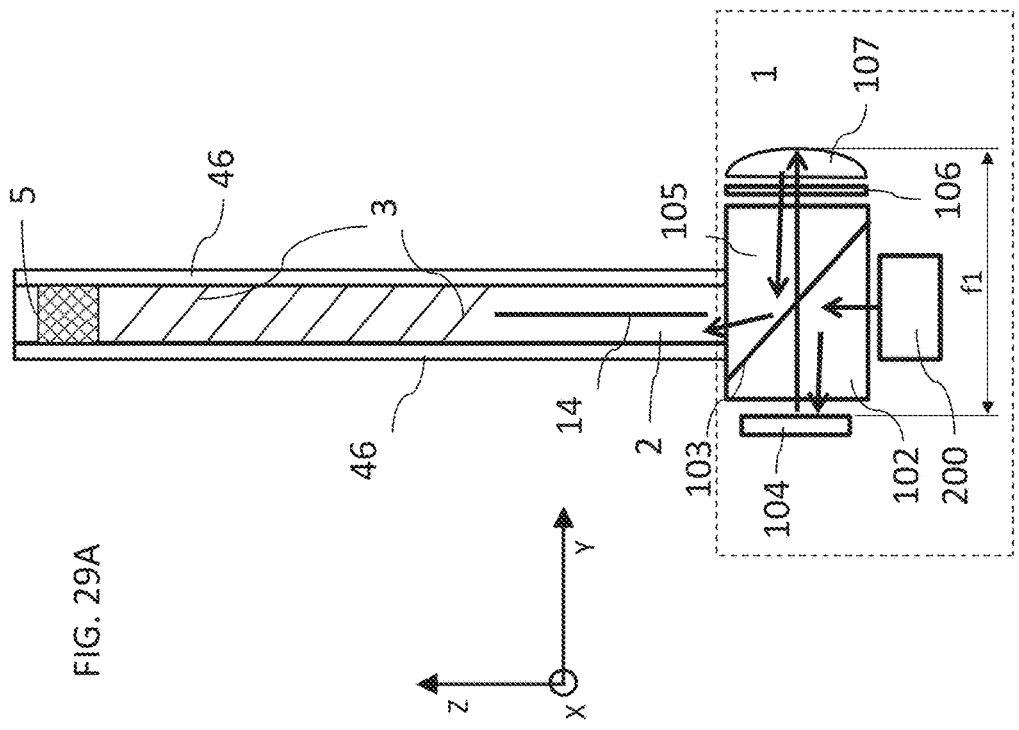
FIG. 29A
FIG. 29B

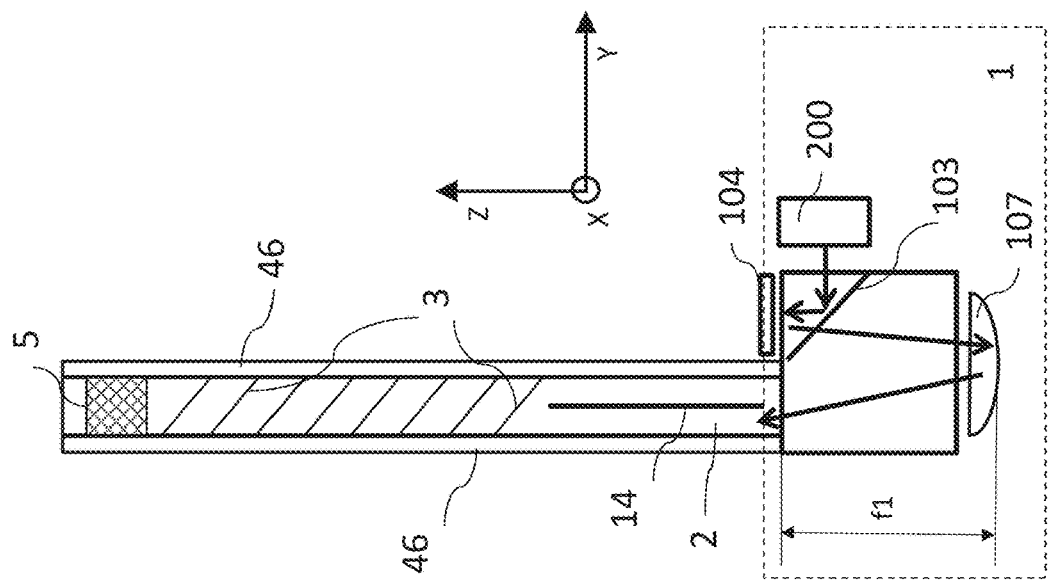
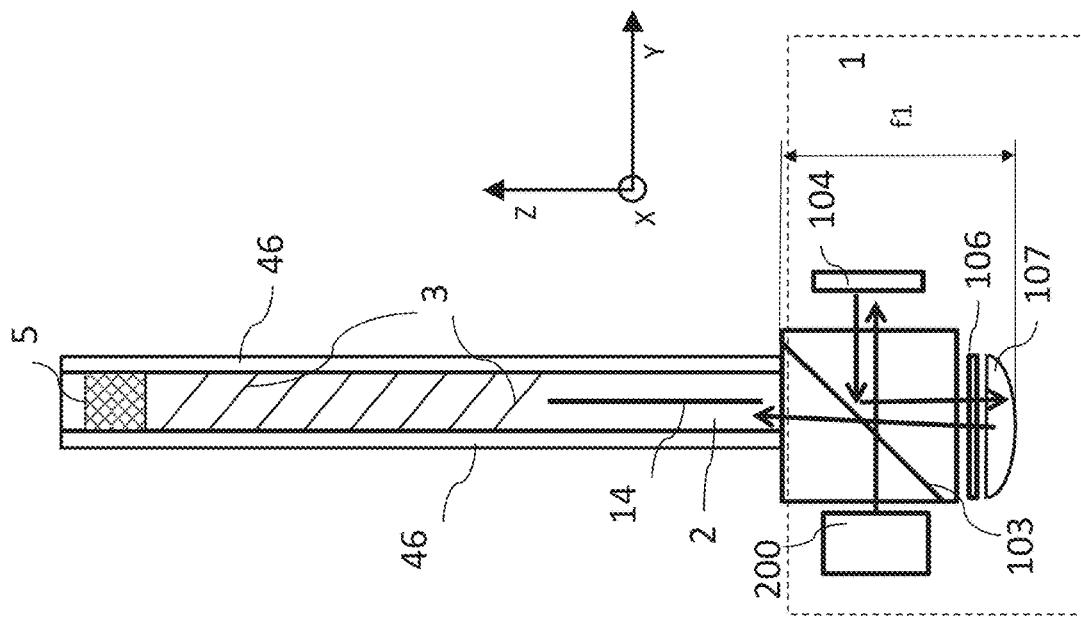
FIG. 30B
FIG. 30A

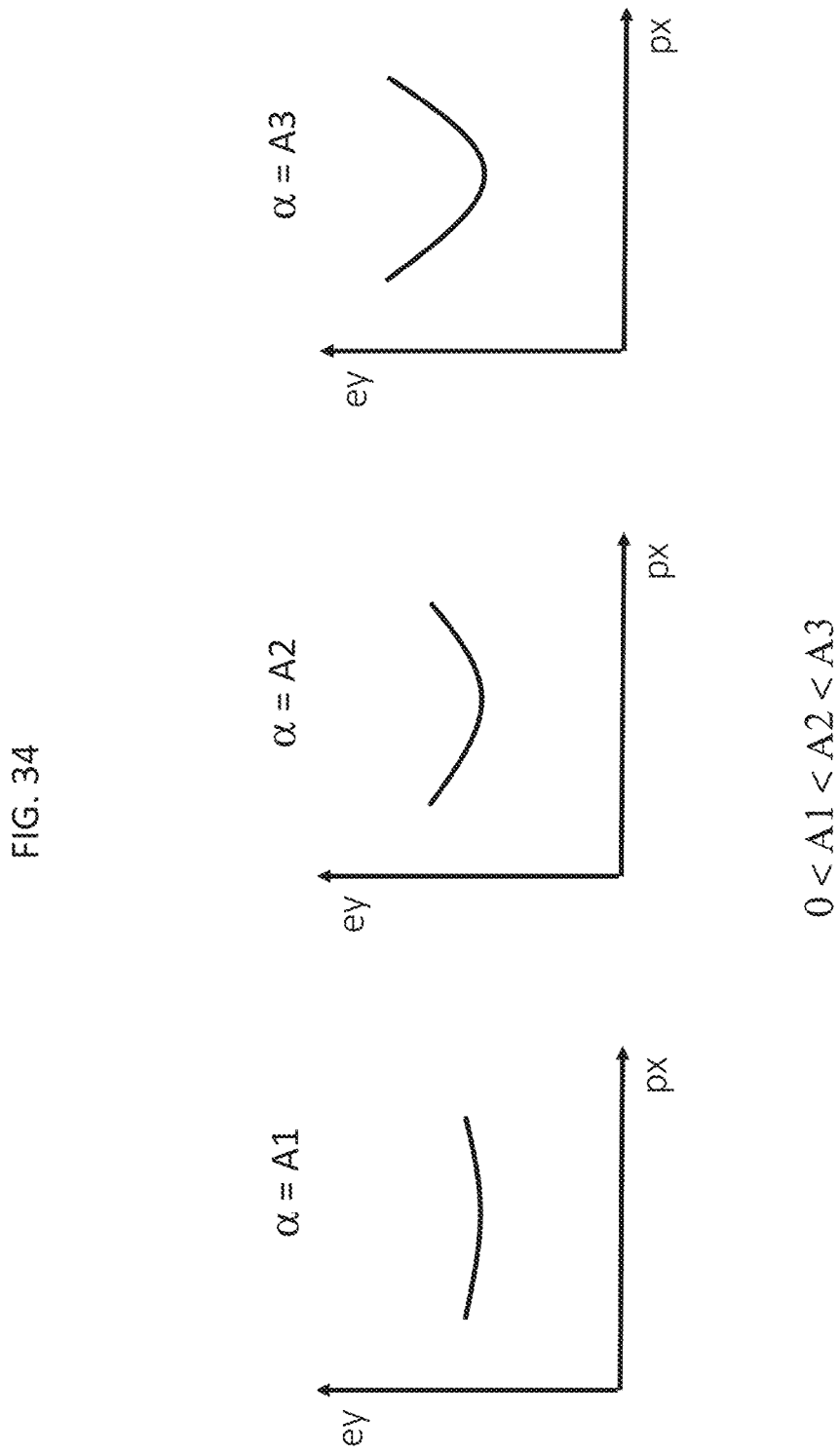

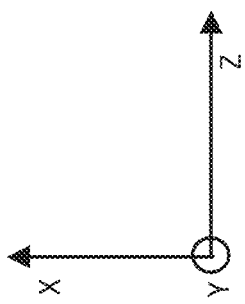
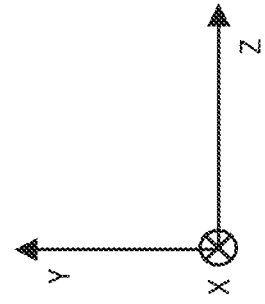
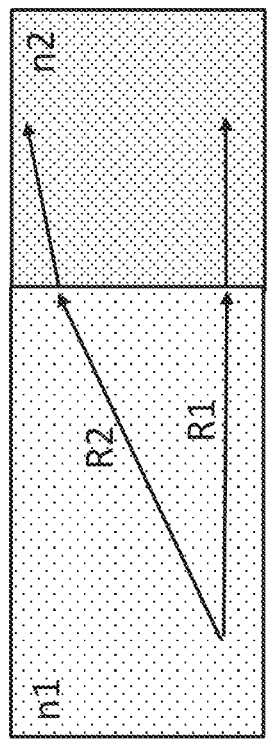
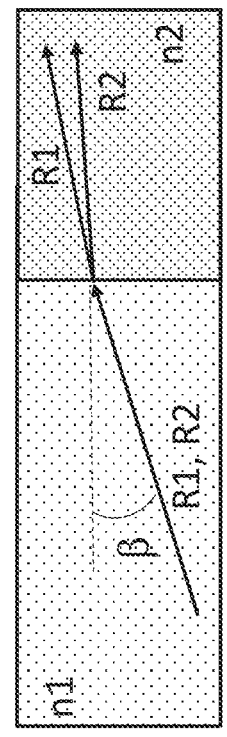
FIG. 35A
FIG. 35B

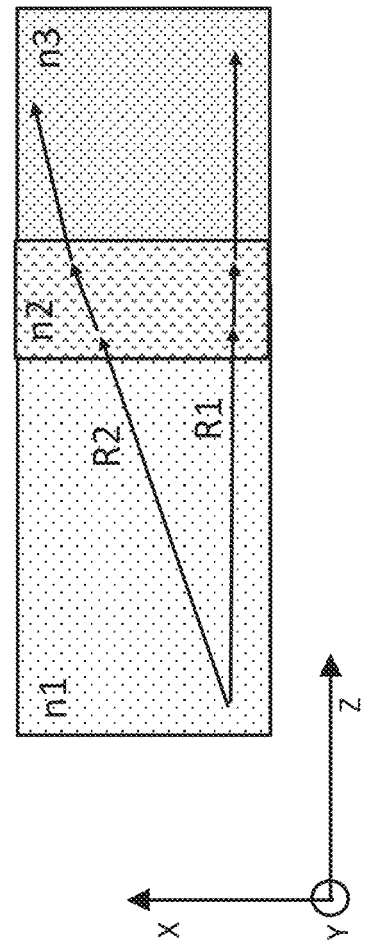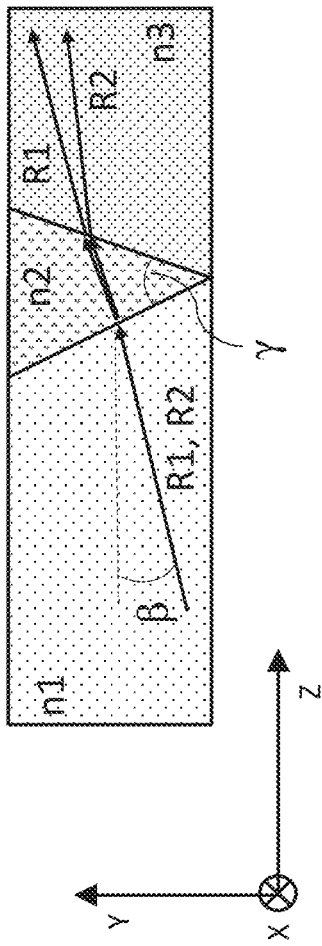
FIG. 36A
FIG. 36B

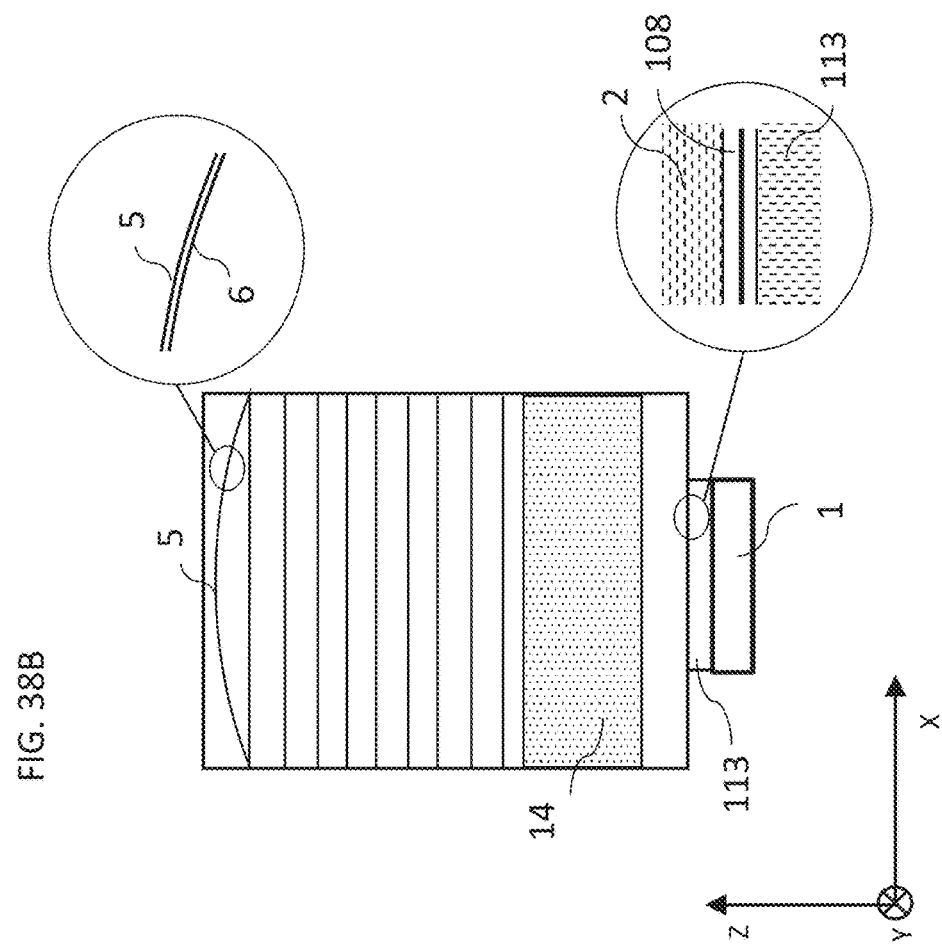
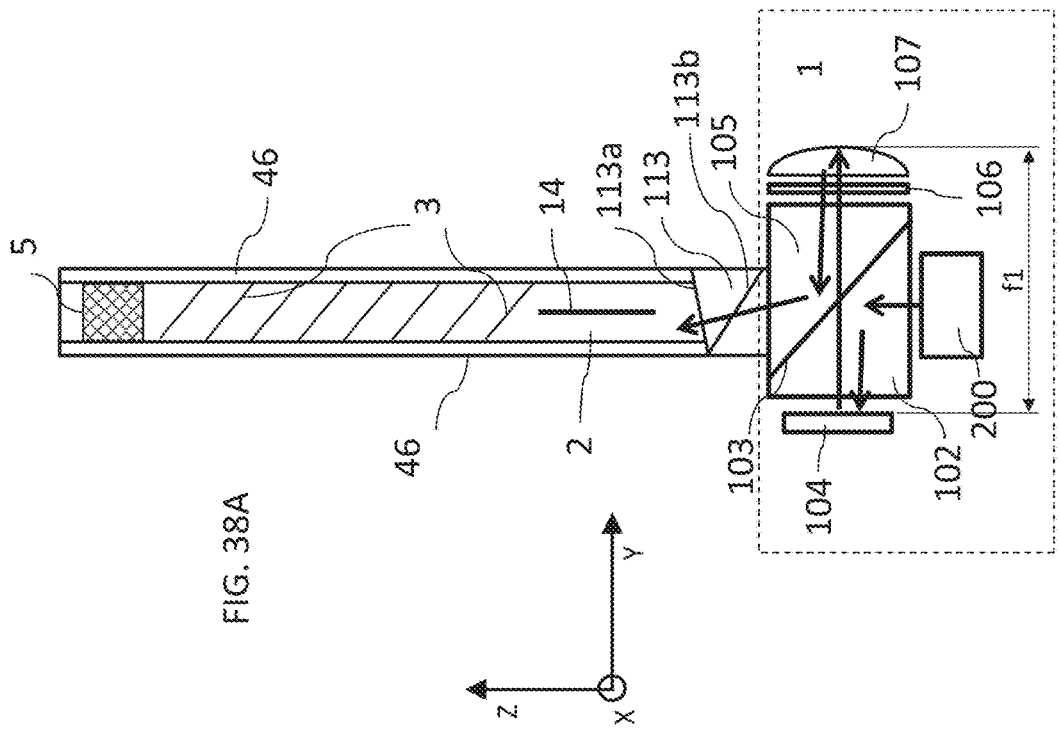

DISPLAYS EMPLOYING ASTIGMATIC OPTICS AND ABERRATION COMPENSATION

FIELD AND BACKGROUND OF THE INVENTION

The present invention relates to near-eye display systems, and, in particular, to near-eye display systems that include a waveguide system for two-dimensional image expansion.

To be commercial feasible, compact waveguide-based optical systems such as near-eye displays typically require two-dimensional pupil expansion in order to achieve a large Field of View (FOV) without increasing the size of the image projection optics. Some display systems use a waveguide system for image expansion. In these systems, light corresponding to an image is coupled-in to a waveguide. The light propagates along the waveguide via total internal reflection (TIR) and is gradually coupled-out via one or more light extraction elements, such as a series of partially reflective angled facets or diffractive elements, thereby expanding the image expansion in one dimension.

For expansion in two dimensions using a waveguide system, a variety of solutions exist. For example, US Patent Publication No. 2014/0036361A1 describes a waveguide incorporating an optical element integrated in the waveguide plane at the waveguide end. As shown in FIG. 1 (corresponding to FIG. 46 in the above-referenced publication), light from a 2D image source 515 is collimated in the plane of the waveguide 503 by an optical element 501, and injected into the waveguide. In the waveguide, the light expands towards a reflective waveguide end 500 (typically a cylindrical mirror) having positive optical power in the lateral direction and becomes collimated after reflection. The reflected light is then extracted from the waveguide via a series of facets 512 thus undergoing expansion in the other dimension.

Another solution is described in US Patent Publication No. US2019/0033598 A1. This system employs pupil 2D imaging with a cylindrical mirror on a waveguide end to achieve pupil expansion in the plane of the waveguide. As shown FIG. 2 (corresponding to FIGS. 4(a)-4(c) of US2019/0033598 A1), a light source 24 is projected by an imaging system 23 into a first guide element 26. For each FOV point, imaging system 23 provides a light beam collimated in the plane normal to the waveguide surface and converging to a focal point in the waveguide plane. Upon reflection from a cylindrical mirror 30 at the end of the waveguide, the beam becomes parallel in all directions. A second waveguide 27 having an extraction zone 31 is used for light extraction (e.g. using mirrors or diffractive elements) and image expansion in the other dimension.

However, the existing solutions described above suffer from various drawbacks, including problems of image aberration introduced by the cylindrical mirror as well as other drawbacks, as will be explained in more detail below.

SUMMARY OF THE INVENTION

The present invention is a display for providing an image to an eye of an observer. The display includes a substrate ("waveguide") having mutually-parallel first and second major external surfaces. The waveguide includes a reflective optical arrangement having cylindrical optical power ("cylindrical mirror") at the waveguide end, and one or more additional components configured to compensate for an image aberration caused by the cylindrical mirror. The systems disclosed herein are aimed at achieving high image resolution with a compact size of the projection optics, which potentially may fit in the frame of conventional goggles. Some of the waveguides disclosed herein include an etendue expander inside the waveguide for increasing the numerical aperture of the system. Some of the waveguides include a projection optics module configured to compensate for aberrations caused by the cylindrical mirror.

Thus, according to the teachings of an embodiment of the present invention there is provided a display for providing an image to an eye of an observer, the display including: (a) an image generator providing image illumination corresponding to the image; (b) a substrate having mutually-parallel first and second major external surfaces; (c) an intermediate optical arrangement configured for directing the image illumination from the image generator so as to propagate within the substrate in a first in-plane direction by internal reflection from the first and second major external surfaces, the intermediate optical arrangement including at least one astigmatic optical element such that the image illumination propagating within the substrate is collimated in a plane perpendicular to the first major external surface and is non-collimated in a plane parallel to the first major external surface; (d) a reflective optical arrangement having cylindrical optical power, the reflective optical arrangement being integrated with the substrate for reflecting at least part of the image illumination so as to propagate in a second in-plane direction by internal reflection from the first and second major external surfaces, the image illumination after reflection from the reflective optical arrangement being collimated image illumination collimated both in a plane perpendicular to, and in a plane parallel to, the first major external surface; and (e) a coupling-out arrangement for coupling out at least part of the collimated image illumination towards an eye of an observer, wherein the reflective optical arrangement has a characteristic aberration, and wherein the intermediate optical arrangement includes at least one element deployed to generate a corrective optical aberration that at least partially cancels out with the characteristic aberration of the reflective optical arrangement.

According to some aspects, the reflective optical arrangement includes a cylindrical mirror integrated with an edge of the substrate, the cylindrical mirror having a cylinder axis perpendicular to the first major external surface.

According to some aspects, the intermediate optical arrangement is configured such that the image illumination propagating within the substrate is convergent in a plane parallel to the first major external surface so as to converge towards a focal locus within the substrate and then diverge before reaching the reflective optical arrangement.

According to some aspects, the display further includes an etendue optical expander integrated with the substrate at the focal locus. Optionally, the etendue expander can be polarization selective.

According to some aspects, the etendue optical expander is a one-dimensional etendue optical expander configured to expand the image illumination in a plane parallel to the first major external surface without broadening the image illumination in a plane perpendicular to the first major external surface.

According to some aspects, the etendue optical expander includes an array of cylindrical microlenses.

According to some aspects, the intermediate optical arrangement includes at least one astigmatic optical element having an effective axis of cylindrical optical power, the effective axis of cylindrical optical power being optically parallel to a cylinder axis of the reflective optical arrangement.

According to some aspects, the astigmatic optical element is integrated with the substrate.

According to some aspects, the astigmatic optical element includes a cylindrical refractive lens integrated with the substrate.

According to some aspects, the astigmatic optical element includes a cylindrical reflective lens integrated with the substrate.

According to some aspects, the astigmatic optical element includes a diffractive optical element with cylindrical optical power integrated with the substrate.

According to some aspects, the reflective optical arrangement includes a diffractive optical element with cylindrical optical power integrated with the substrate.

According to some aspects, the astigmatic optical element is external to the substrate.

According to some aspects, the astigmatic optical element includes a refractive lens with cylindrical optical power.

According to some aspects, the astigmatic optical element includes a reflective lens with cylindrical optical power.

According to some aspects, the astigmatic optical element includes a diffractive optical element with cylindrical optical power.

According to some aspects, the intermediate optical arrangement is configured such that the image illumination propagating within the substrate towards the reflective optical arrangement is divergent in a plane parallel to the first major external surface.

According to some aspects, the image generator includes an elongated spatial light modulator having a width and a length, the length being at least five times greater than the width, the spatial light modulator being deployed with the length aligned parallel to the first major external surface.

According to some aspects, the intermediate optical arrangement includes a polarizing beam splitter (PBS) prism optically coupled to the substrate, the spatial light modulator being optically coupled to a face of the PBS prism.

According to some aspects, the spatial light modulator has an effective pixel area which is oblong, having a first pixel pitch parallel to the length and a second pixel pitch smaller than the first pixel pitch parallel to the width.

According to some aspects, each physical pixel element for the spatial light modulator is smaller than the first pixel pitch and larger than the second pixel pitch, a plurality of the physical pixel elements being staggered within each first pixel pitch.

According to some aspects, the reflective optical arrangement is configured to have a first reflectivity associated with a first subset of incident angles, and a second reflectivity lower than the first reflectivity associated with a second subset of incident angles, wherein the first subset includes angles within a range corresponding to the image illumination, and the second subset includes angles not within the first subset.

According to some aspects, the coupling-out arrangement is polarization selective so as to at least partially couple out image illumination of a first polarization while substantially transmitting image illumination of a second polarization, wherein the intermediate optical arrangement is configured for directing the image illumination from the image generator to propagate within the substrate in the first in-plane direction with the second polarization, and wherein a quarter-wave plate is associated with the reflective optical arrangement so that the collimated image illumination propagating in the second in-plane direction has the first polarization so as to be coupled-out by the coupling-out arrangement.

According to other teachings of an embodiment of the present invention there is provided a display for providing an image to an eye of an observer, the display including: (a) an image generator providing image illumination corresponding to the image; (b) a substrate having mutually-parallel first and second major external surfaces; (c) an intermediate optical arrangement configured for directing the image illumination from the image generator so as to propagate within the substrate in a first in-plane direction by internal reflection from the first and second major external surfaces, the intermediate optical arrangement including at least one astigmatic optical element such that the image illumination propagating within the substrate is collimated in a plane perpendicular to the first major external surface and is non-collimated in a plane parallel to the first major external surface; (d) a reflective optical arrangement having cylindrical optical power, the reflective optical arrangement being integrated with the substrate for reflecting at least part of the image illumination so as to propagate in a second in-plane direction by internal reflection from the first and second major external surfaces, the image illumination after reflection from the reflective optical arrangement being collimated image illumination collimated both in a plane perpendicular to, and in a plane parallel to, the first major external surface; and (e) a coupling-out arrangement for coupling out at least part of the collimated image illumination towards an eye of an observer; wherein the coupling-out arrangement is polarization selective so as to at least partially couple out image illumination of a first polarization while substantially transmitting image illumination of a second polarization, wherein the intermediate optical arrangement is configured for directing the image illumination from the image generator to propagate within the substrate in the first in-plane direction with the second polarization, and wherein a quarter-wave plate is associated with the reflective optical arrangement so that the collimated image illumination propagating in the second in-plane direction has the first polarization so as to be coupled-out by the coupling-out arrangement.

BRIEF DESCRIPTION OF THE DRAWINGS

The invention is herein described, by way of example only, with reference to the accompanying drawings, wherein:

FIGS. 3A-3C show schematic representations illustrating the principles of operation of the known systems;

FIGS. 7A-7C show schematic representations of light reflecting off a cylindrical mirror;

FIGS. 12A-12B show schematic representations of an embodiment of a waveguide system including polarization control elements

FIGS. 25A-25B show schematic representations of an embodiment of a waveguide system including a biconic mirror in the POD;

FIGS. 26A-26B show schematic representations of an embodiment of the system shown in FIGS. 25A-25B including an etendue expander;

FIGS. 29A-29B show a mixer and cover plates according to an embodiment of the system as shown in FIG. 28;

FIGS. 30A-30B show alternative arrangements of the components in the POD;

FIG. 34 shows a series of graphs illustrating the qualitative behavior of an image aberration as the incidence angle increases;

FIGS. 35A-35B show a series of ray diagrams illustrating a diverging beam passing through a plane refractive interface;

FIGS. 36A-36B show a series of ray diagrams illustrating a diverging beam passing through a wedge prism;

FIGS. 38A-38B show schematic representations of an embodiment of a waveguide system including a wedge prism;

DESCRIPTION OF THE PREFERRED EMBODIMENTS

Figure 1:
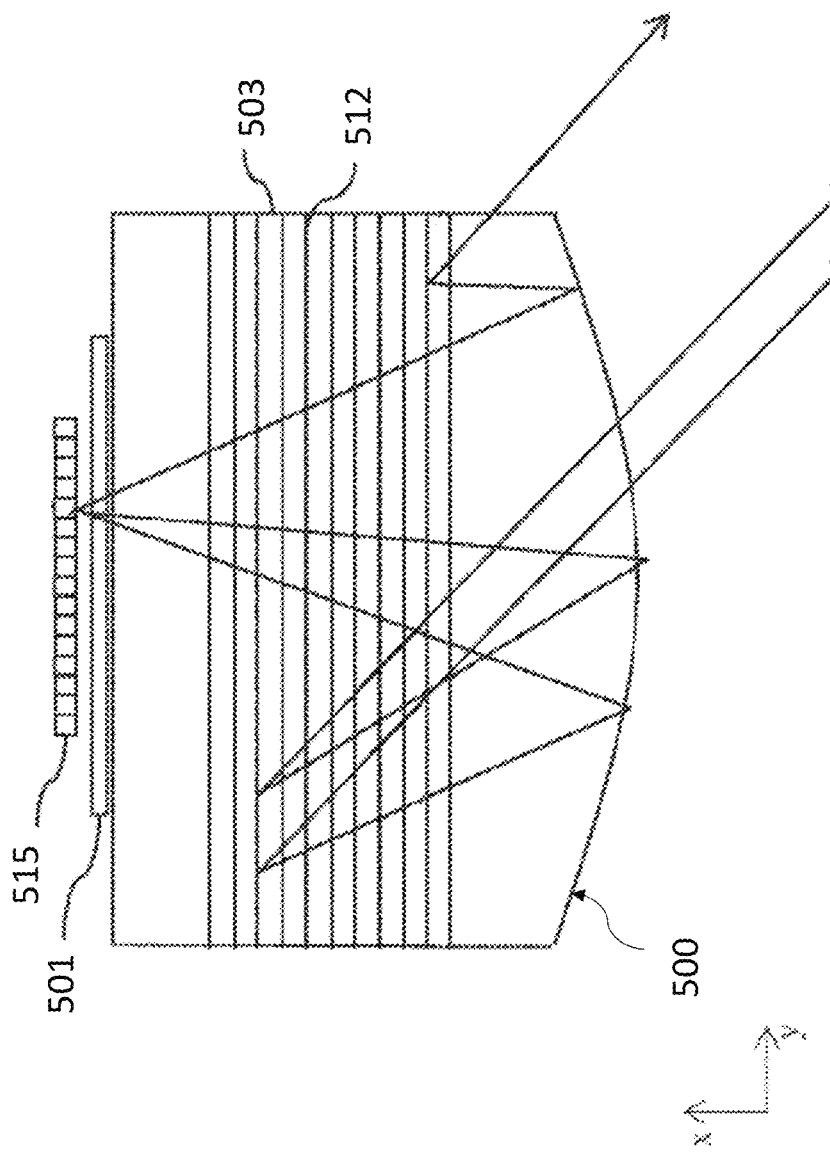
FIGS. 1-2 show embodiments of known displays.
Figure 2:
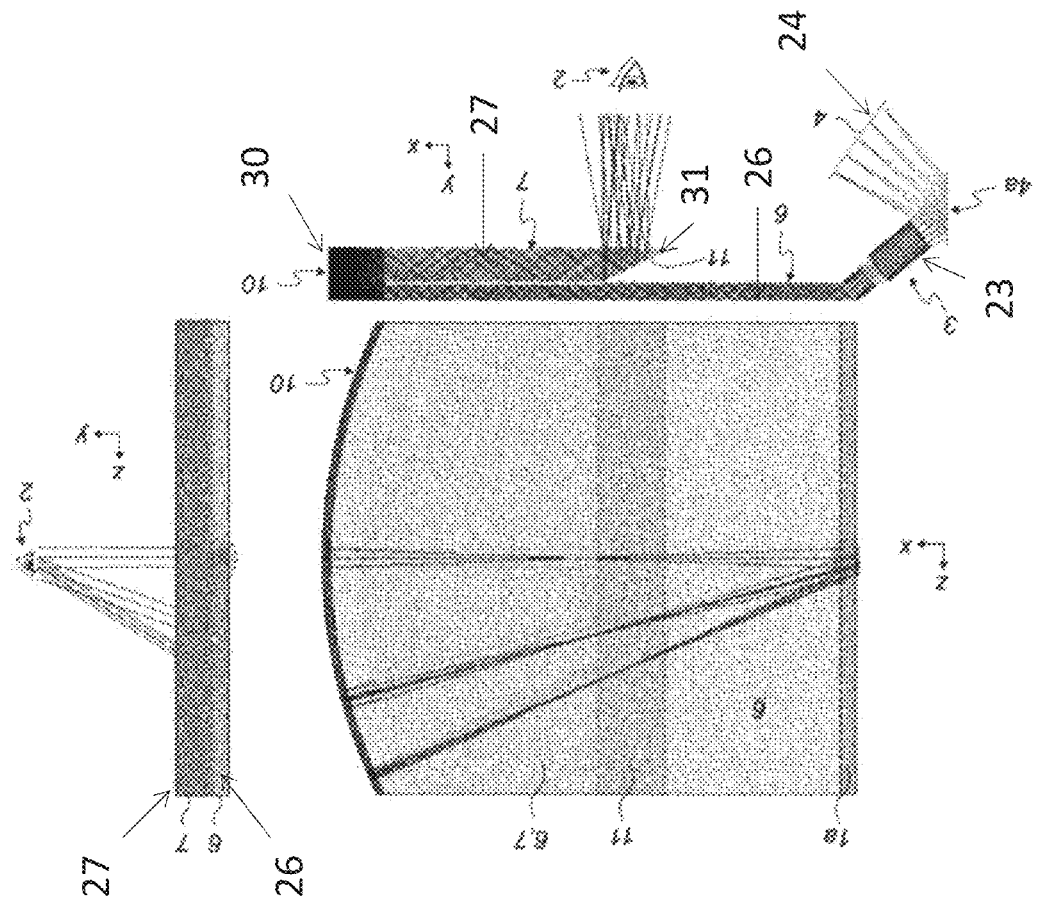

The term "display" is used herein to describe any type of display, including but not limited to, a head-up display and a near-eye display, whether for virtual reality or augmented reality applications. "Display" is used interchangeably herein with "waveguide system".

The term "image generator" is used herein to refer to any element or device that is used to generate an image, including but not limited to, spatial light modulators (SLM) such as a liquid-crystal on silicon (LCOS) chip, a micro-LED display, and various scanning arrangements in which a scanning beam is modulated synchronously with its scanning motion to generate an image.

The term "substrate" is used herein interchangeably with "waveguide" to refer to any light-conveying structure having mutually-parallel first and second major external surfaces along which light propagates by internal reflection at the major surfaces. Light is referred to as propagating in an "in-plane direction" which is the direction in which the light propagates as viewed perpendicular to the waveguide, i.e., ignoring the up-down internal reflections at the major surfaces. The phrase "in-plane" is used to refer to directions parallel to the major external surfaces of the substrate.

The phrase "having cylindrical optical power" is used herein in the description and claims to refer to any optical element or arrangement which has unequal optical power in two axes, such elements also being referred to as "astigmatic". In such cases, the axis with the higher optical power is referred to as the "effective cylinder axis". An element or arrangement is referred to as "having only cylindrical optical power" if it has optical power along one axis with no (or negligible) optical power along the perpendicular axis. Such elements are also referred to as "cylindrical lenses", although the shape of the lens need not necessarily be part of a geometrical cylinder, and may instead employ surfaces formed by sweeping a circle, a conic curve, or a more complex curve, along a direction normal to the waveguide surface.

The phrase "optically parallel" is used to refer to axes of the optical system which are either physically parallel or are optically equivalent to parallel axes. In certain implementations, for reasons of compactness or other design considerations, a light path may be folded by use of one or more reflective element. In such cases, "optically parallel" refers to axes which, if the light path were unfolded, would be parallel.

All "lenses" referred to herein, unless specified otherwise, may be refractive lenses, reflective lenses, diffractive optical elements with optical power (such as based on Bragg gratings), or any combination of the above. The singular term "lens" should be understood to include a plurality of lenses arranged as a lens group.

Various embodiments of the present invention refer to image illumination which is collimated in a plane perpendicular to (the first major external surface of) the substrate, and is non-collimated in a plane parallel to the substrate. Where the in-plane image illumination is converging, reference may be made to a "focal locus" at which the in-plane rays come to a focus. This may also be referred to as a "focal surface" or "focal plane". However, it need not be planar, and is not a "focal plane" in the common sense, since the illumination is not focused in the perpendicular plane such that no real image is generated. The focal locus does however denote the location (surface or plane) to which the in-plane rays for a given pixel converge.

The phrases "etendue optical expander" and "etendue expander" are used herein to refer to any structure which increases the etendue (spatial spread) of a beam. The particularly preferred examples of the present invention employ orientation-specific expanders, which have minimal impact on the pattern of image illumination in a plane perpendicular to the substrate.

As used herein, the term "intermediate optical arrangement" refers either to an astigmatic optical element configured to generate a corrective optical aberration, or any combination of optical elements that includes at least one astigmatic optical element and that is collectively configured to generate a corrective optical aberration, optionally combined with additional optical properties required for the particular implementation. It is described as "intermediate" in the sense that it is located in the light path between the image generator and the reflective optical arrangement, but it may be anywhere in that light path, whether as part of an image projector or integrated with the substrate, as will be exemplified below.

As described above in the background section, existing solutions for two-dimensional image expansion using a waveguide system suffer from various types of image aberrations, leading to a poor quality image. These aberrations will now be described in more detail with reference to FIGS. 3A-7C, illustrating various problems associated with the prior art systems.

FIGS. 3A-3C illustrate schematically the general operation a waveguide such as that of US 2019/0033598 A1. As shown in FIG. 3A, light is focused in the plane of the waveguide 700 by lens 702, which is integrated in the projection optics 704. Cylindrical mirror 706 collimates the light and completes the pupil imaging at the Eye Motion Box (EMB) (not shown). The image is extracted using optical light extraction elements such as facets (or other optical elements) arranged within a light-extraction area 708 of the waveguide. As shown in FIG. 3B, pupil imaging magnification and FOV is defined by the focal lengths f1 and f2 of lenses 702 and 706, respectively. It should be noted that in this system, lens 702 is oriented at an angle relative to the plane of the waveguide, as shown in FIG. 3C illustrating a side-view of the system.

Figure 4B:
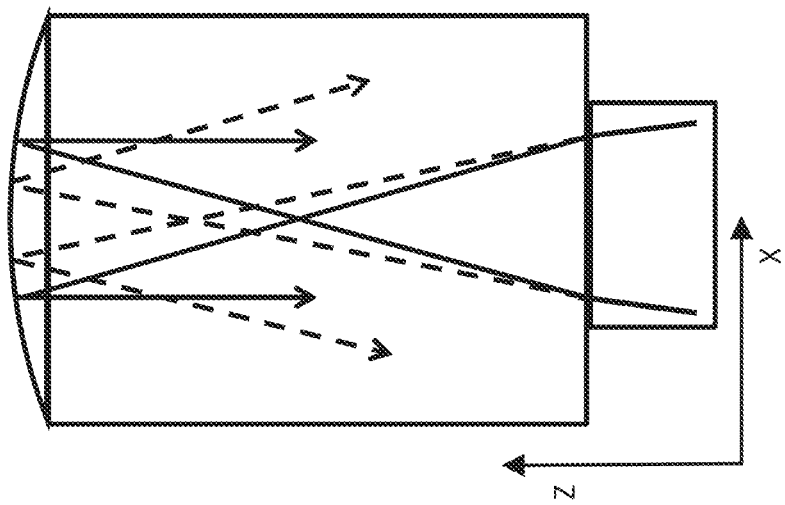
FIGS. 4A-4B show schematic representations of a type of image aberration that exists in the known systems.
Figure 4A:
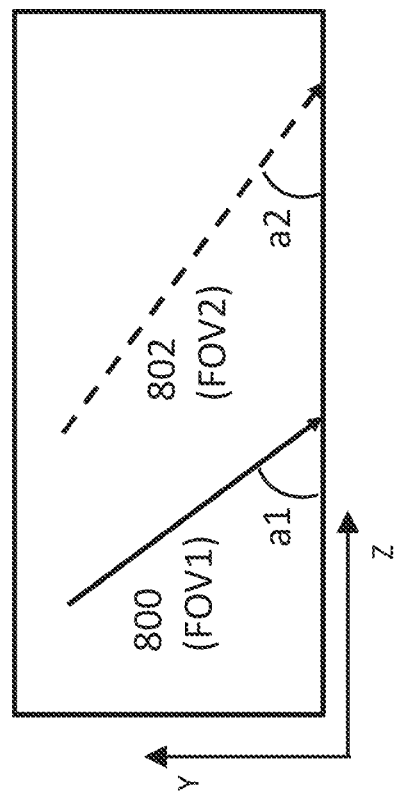

Problem #1: Aberrations Caused by Optical Path Difference of FOVs Upon Reflection From the Cylindrical Mirror Referring now to FIGS. 4A-4B, illustrating YZ-plane and ZX-plane schematic representations of the light path within a waveguide system, consider two rays 800, 802, each associated with a different respective point in the FOV. Due to the difference in the rays' respective incidence angles a1 and a2, the paths of the rays in the waveguide plane are different. As shown in FIG. 4B, rays 800 and 802 have the same convergence before injection into the waveguide, but inside the waveguide the rays converge to different focal points. As a result, while the beam of FOV1 can be collimated after the reflection from the cylindrical mirror, the beam of FOV2 will be divergent after reflection from the cylindrical mirror, causing an aberration in the perceived image.

Figure 5B:
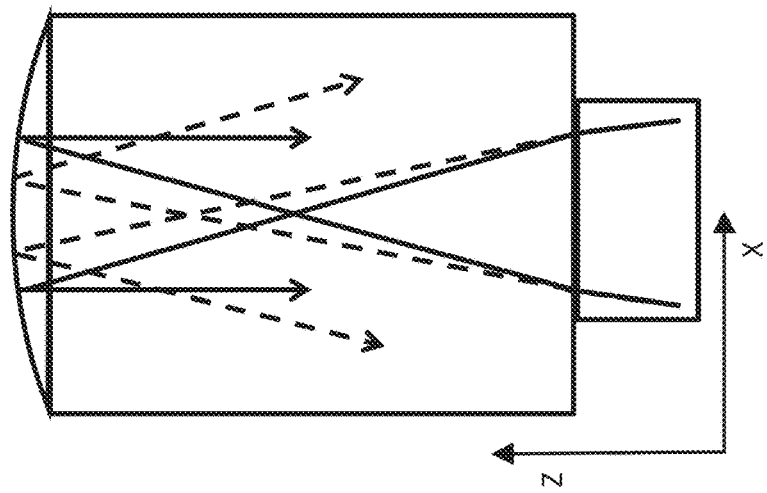
FIGS. 5A-5B show schematic representations of another type of image aberration that exists in the known systems.
Figure 5A:
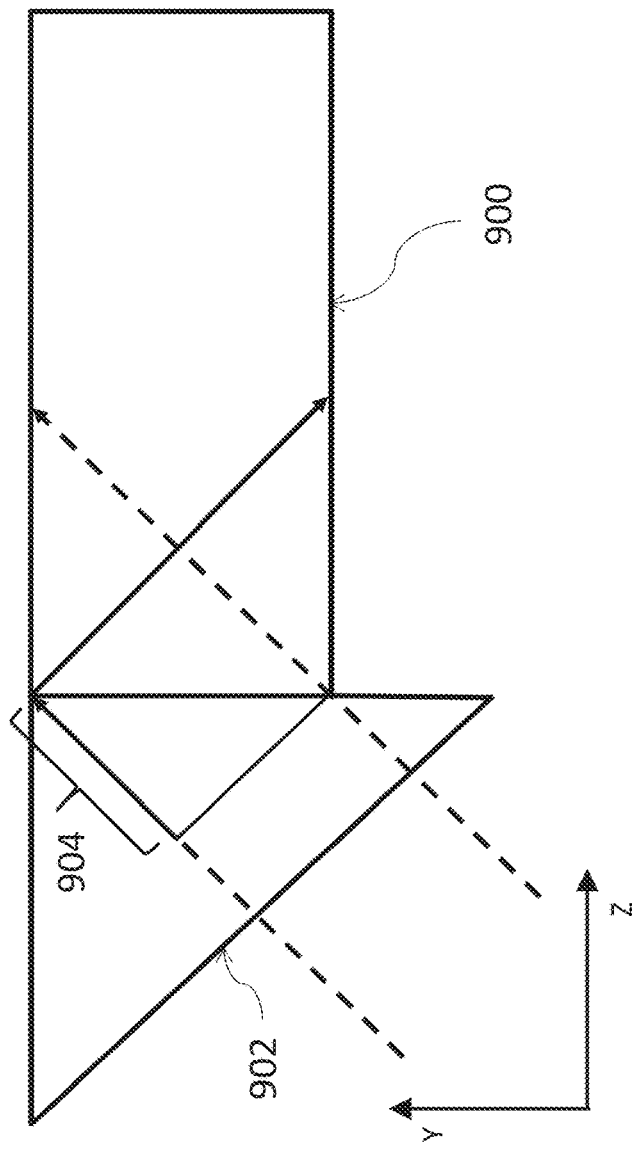

Problem #2: Aberrations Caused by the Optical Path Difference Introduced by the Injection of Light Into the Waveguide Referring now to FIGS. 5A-5B, illustrating schematic representations of the light path within a waveguide system, consider a light beam injected into waveguide 900 using wedge prism 902. The beam is collimated in the YZ plane and is converging in the direction orthogonal to the YZ plane. As shown in FIG. 5A, the rays will have an optical path difference 904 after being injected into the waveguide. The optical path difference 904 will result in an image aberration, as illustrated in FIG. 5B, because the rays that are injected through different points along the wedge prism will converge to different focal points in the waveguide plane.

Problem #3: Aberrations Caused by Non-Parallel Rays After Reflection From the Cylindrical Mirror Other image aberrations are caused by the cylindrical mirror at the waveguide end, whereby rays that were parallel in the direction orthogonal to the waveguide plane become non-parallel after reflection from the cylindrical mirror.

Figure 6A:
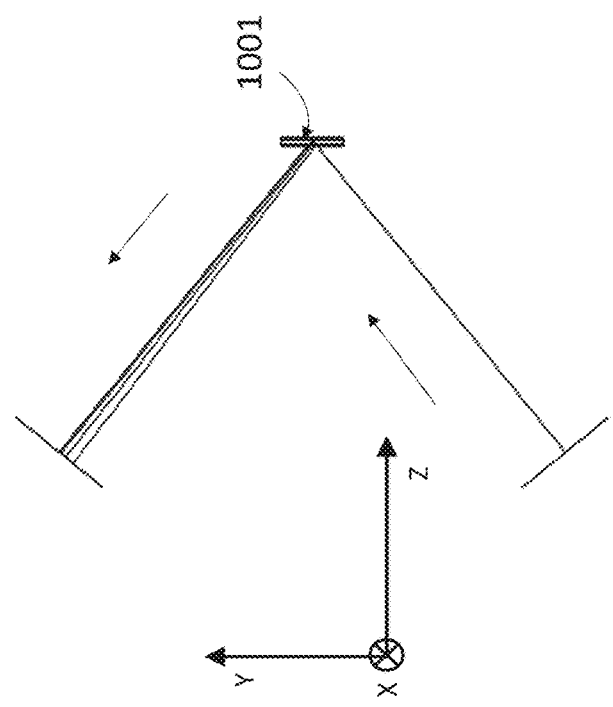
FIGS. 6A-6C show schematic representations of another type of image aberration that exists in the known systems.
Figure 6B:
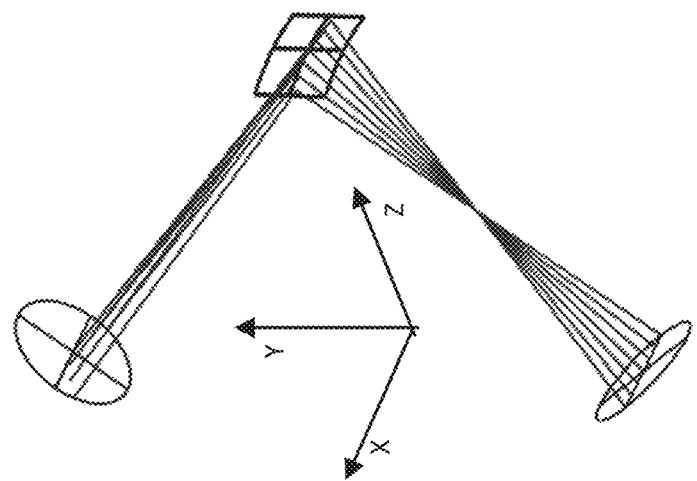
Figure 6C:
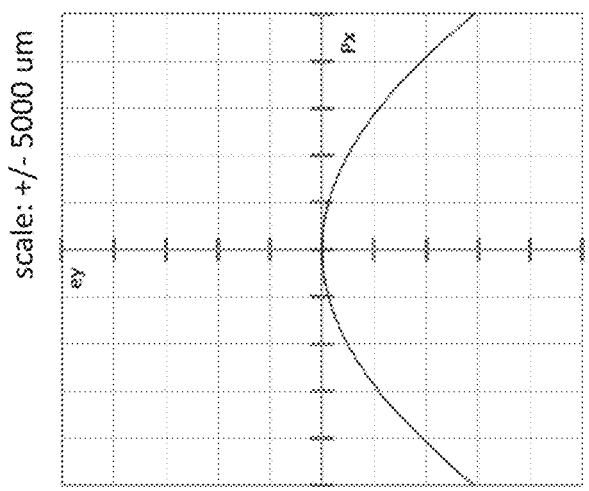

By way of background, FIGS. 6A-6C illustrate schematic representations of light reflecting off of a cylindrical mirror 1001. A light beam collimated in the YZ plane and convergent in the orthogonal direction is directed to cylindrical mirror 1001 oriented parallel to the y-axis. Note that the XZ-plane is orthogonal to the mirror's surface. After reflection from the mirror, the beam is no longer parallel in YZ plane. This is apparent from FIG. 6B and FIG. 6C, which show a ray fan in the focal plane of an ideal lens placed after the mirror. The ray fan demonstrates a shape typical for a coma aberration. It should be noted that this type of aberration cannot be corrected by optimizing the shape of the cylindrical mirror, such as by giving it a conical or a more complex shape.

The aberrations of a cylinder mirror can be further understood with reference to FIGS. 7A-7C, illustrating a schematic diagram of light rays reflecting off a cylinder mirror. As shown in FIGS. 7A-7B, parallel rays R1 and R2, are incident on a cylinder mirror at an angle a with respect to the plane to which the mirror surface is orthogonal (i.e. the XZ-plane). At the point O at which R1 intersects the surface of the mirror, the mirror surface is normal to the z-axis. As a result, the reflection angle for ray R1 is the same as its incidence angle. The ray R2 is rotated after reflection by an angle θ around the y-axis. As a result, after reflection, R1 and R2 are not parallel in the YZ-plane, as shown in FIG. 7C.

In addition to the problems described above, some of the prior art systems including US 2014/0036361 and/or US 2019/0033598 suffer from various other drawbacks. For example, some of these systems require a relatively small EMB in the z-direction. Increasing the EMB would require decreasing the F# ("f-number") of the projection optics, which complicates projection optics design.

Another drawback of the arrangements described in US 2019/0033598 A1, is that the light coupling between the two waveguides results in an incomplete filling of the waveguide aperture, resulting in dark stripes in the observed image. This phenomenon is explained in more detail below with reference to FIGS. 7-11.

The waveguide-based near-eye display systems (also referred to herein as "waveguide systems") described herein improve over existing systems by providing enhanced image quality (e.g. higher achievable resolution, non-existence of black lines, etc.) while maintaining a compact design. In some embodiments, as will be detailed below, an etendue expander is used to achieve an even more compact size and simpler projection optics design, while enabling a large EMB size. In some embodiments, additional components are used to manage the polarization state of light within the waveguide, so that 2D imaging is achieved in a single waveguide.

General Embodiment of the Proposed Waveguide System

Figure 8:
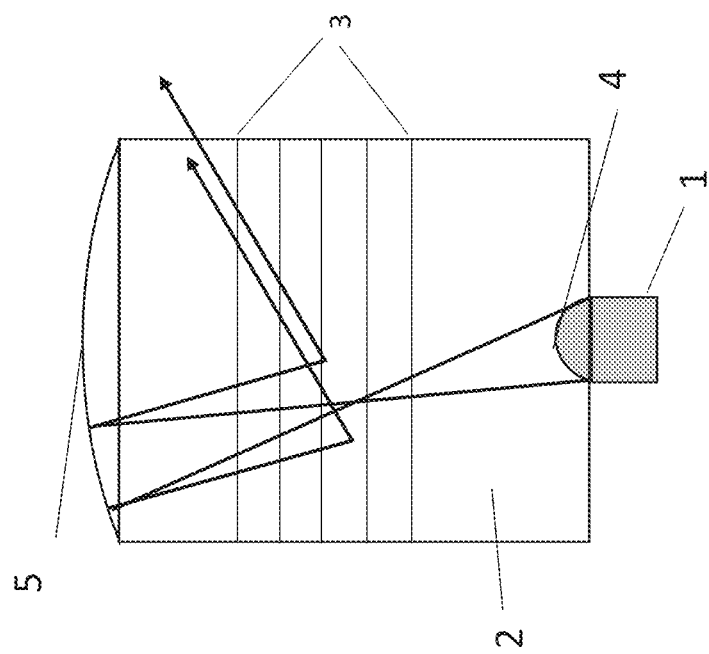
FIG. 8 shows a schematic representation of a solution to the problems of image aberrations.

By way of introduction to the concepts detailed herein, FIG. 8 shows a schematic representation of a solution to the problems posed above. In general, the inventors have found it beneficial to introduce an astigmatic focusing element 4 ("lens 4") into the waveguide 2 at the waveguide end opposite the cylindrical mirror ("lens 5"). Lens 4 can be implemented as a cylinder optical element, reflective or refractive. As shown in FIG. 8, lens 4 bends the rays (shown as arrows) exiting from the projection optics unit 1 ("POD 1") in the plane of the waveguide. The ray bending is the same for all fields and thus no optical path difference in the waveguide plane is introduced after reflection from lens 5. Waveguide 2 further includes a light extracting area 3 with one or more optical elements (e.g. shown here as facets) for extracting the light from the waveguide toward the EMB (not shown).

An integrated lens 4 also solves the second problem identified above with reference to FIGS. 5A-5B by enabling the rays to converge at the same focal point, because the focusing of the rays in the waveguide plane is achieved after the rays has been coupled inside the waveguide.

In addition, lens 4 solves the third problem identified above with reference to FIGS. 7A-7C because lens 4 acts as a second mirror element in the waveguide thereby introducing an image aberration similar to the aberration caused by lens 5 but with opposite sign, thereby compensating for the aberration caused by lens 5.

Figure 9C:
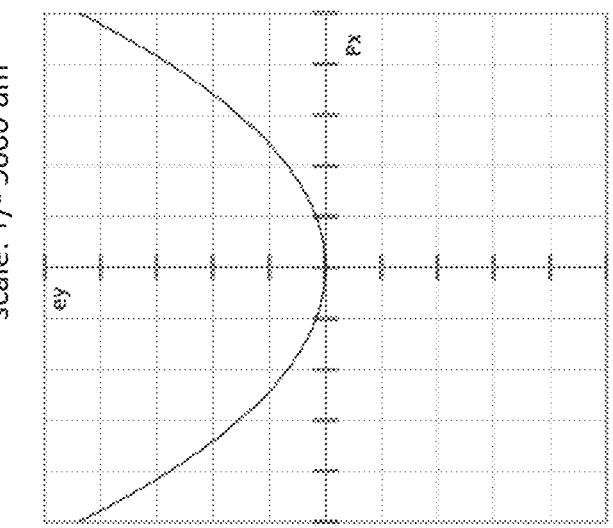
FIGS. 9A-9C show schematic representations of light reflecting off a cylindrical mirror.
Figure 9B:
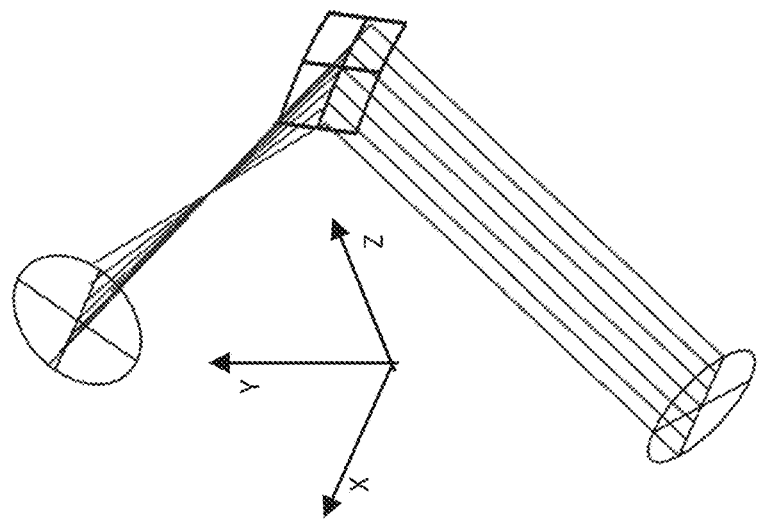
Figure 9A:
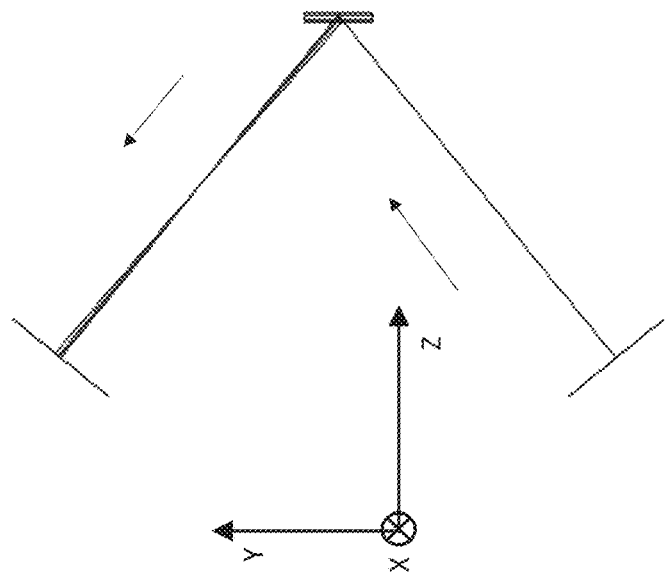
Figure 10C:
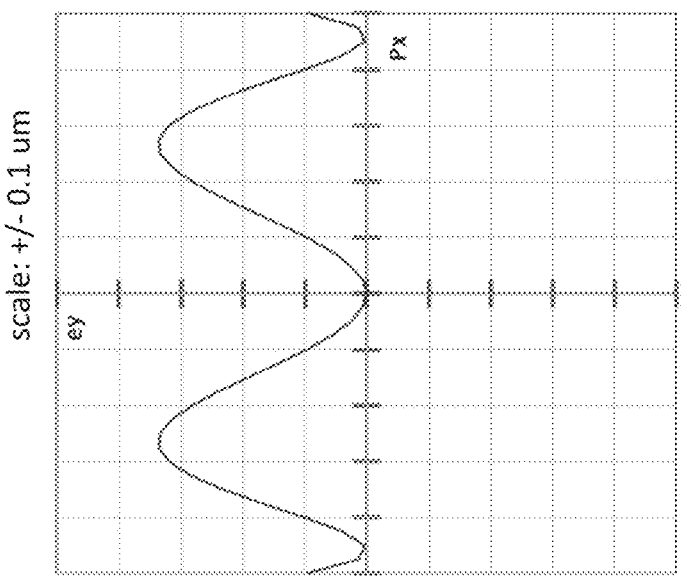
FIGS. 10A-10C show schematic representations of a system with two mirrors.
Figure 10B:
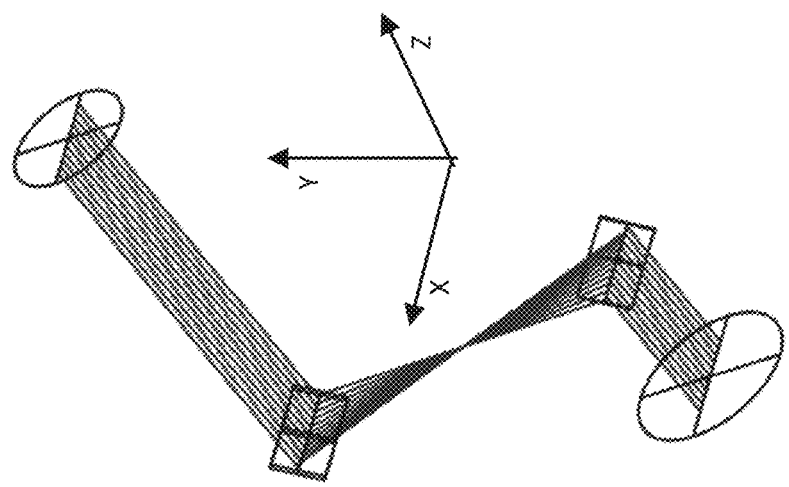
Figure 10A:
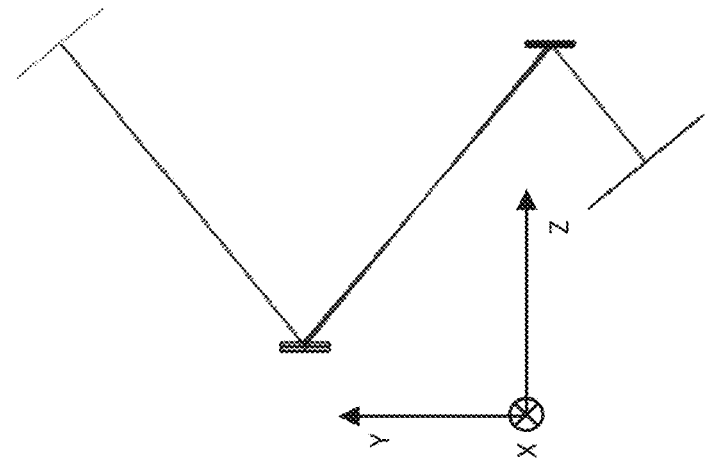

To further demonstrate this principle, consider a parallel beam propagating to a cylindrical mirror as shown in FIGS. 9A-9B. The aberration of the beam after reflection from the mirror is shown in FIG. 9C. This aberration is similar to the aberration shown above in FIG. 6C but with an opposite sign. As shown in FIGS. 10A-10B, in a system with two mirrors it is possible to achieve a parallel beam after reflection from the second mirror. Consequently, such a system of two cylindrical mirrors in a waveguide can transform an input parallel beam of light propagating inside the waveguide into a different parallel beam of light. As FIG. 10C shows, any resulting aberration remaining after reflection from both mirrors will be very small, and in most cases negligible. It should be noted that at least one of the two cylindrical mirrors can be replaced by a cylindrical lens, which will also result in a mutual compensation of aberrations.

Generally speaking, if a 2D imaging system in a waveguide converts a collimated beam propagating in a waveguide into a different beam collimated in the waveguide plane, this new beam is also collimated in the plane orthogonal to the plane of the waveguide. Thus, such a 2D imaging system compensates for aberrations in the direction orthogonal to the waveguide plane caused by cylinder optics.

Thus the currently disclosed subject matter improves upon the prior art in several ways:

i) the image completely fills the waveguide aperture in the direction normal to the waveguide plane thereby generally improving the overall image and in particular causes no black lines to be seen in the observed image;

ii) aberrations caused by the cylinder mirror at the waveguide end are compensated for, thereby allowing a higher resolution image of sufficient image quality;

iii) as will be detailed below, embodiments include systems with an enhanced pixel layout in the image source that enables achieving a higher image resolution and smaller image source and projection optics dimensions as compared to prior art; and iv) intensity of the ghost images caused by the reflection of objects in the outside world by the cylinder mirror is reduced, as will be explained below.

Figure 11A:
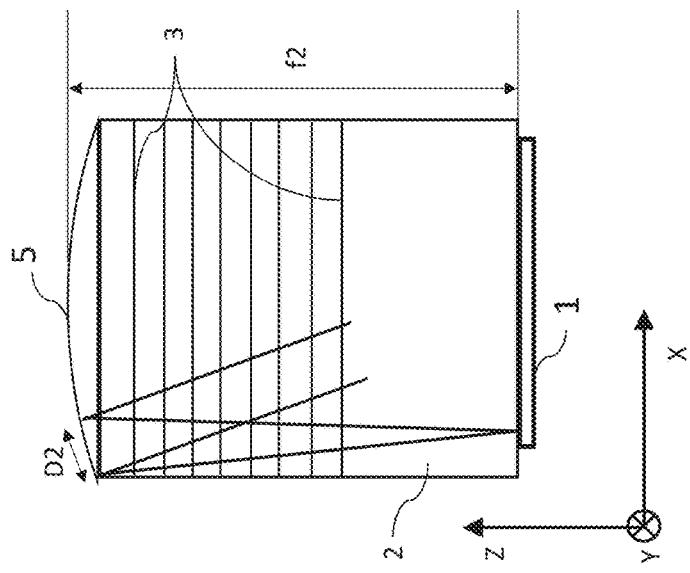
FIGS. 11A-11C show schematic representations of an embodiment of a waveguide system.
Figure 11B:
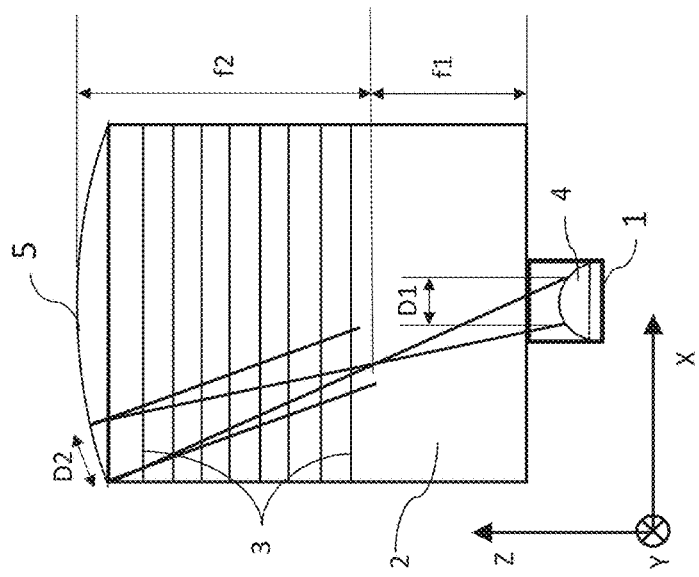
Figure 11C:
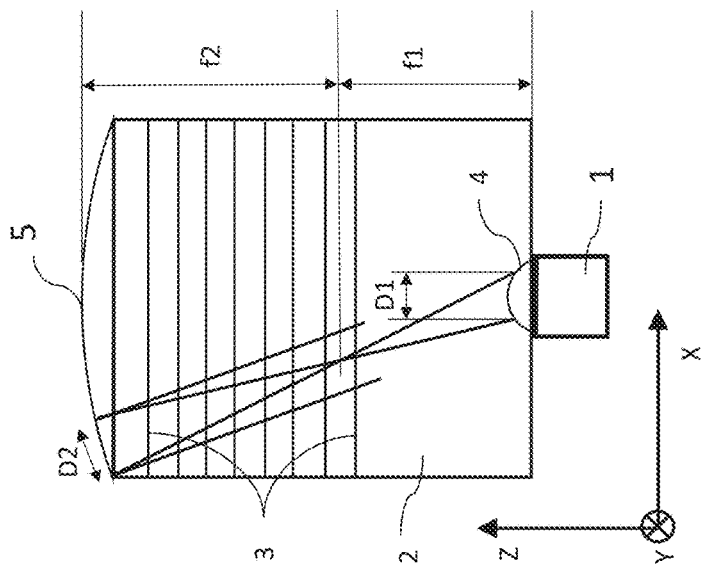

Having described the general concept, FIGS. 11A-11C show schematic representations of an embodiment of a waveguide system in more detail. Referring now to FIG. 11A, the illustrated waveguide system includes an image generator comprised within a projection optics module 1 (hereinafter "POD 1"). The image generator provides image illumination corresponding to the image. POD 1 is optically coupled to waveguide 2, and provides image illumination corresponding to an image for injection into the waveguide.

Waveguide 2 further includes an intermediate optical arrangement configured for directing the image illumination from said image generator so as to propagate within the waveguide in a first in-plane direction by internal reflection from the major external surfaces of the waveguide. The intermediate optical arrangement provides collimated image illumination in a plane perpendicular to the waveguide's major external surfaces and non-collimated image illumination in a plane parallel to the major external surfaces. In FIGS. 11A-11C, the waveguide's major parallel external surfaces are parallel to the plane of the paper. The intermediate optical arrangement is implemented in FIGS. 11A-11B as an astigmatic optical element 4 (referred to herein as "lens 4").

Waveguide 2 further includes an integrated reflective optical arrangement 5 having cylindrical optical power (hereinafter referred to as "lens 5") for reflecting at least part of the image illumination so as to propagate in an in-plane direction by internal reflection from the major external surfaces. The image illumination after reflection from lens 5 is collimated image illumination that is collimated both in a plane perpendicular to, and in a plane parallel to, the waveguide's major external surfaces.

Lens 5 introduces a characteristic aberration, and lens 4 introduces a corrective aberration to at least partially cancel out with the characteristic aberration generated by lens 5.

In some embodiments, as shown in FIGS. 11A-11C, lens 5 can be integrated with an edge of the waveguide and have a cylinder axis perpendicular to the waveguide's major external surfaces. In some embodiments, lens 5 can be, or include, a diffractive optical element with cylindrical power integrated with the waveguide.

In some embodiments, lens 5 may have a high reflectivity in the range of angles corresponding to the image illumination 1, and low reflectivity (being either transmissive or absorbing) at angles outside this range. In this way, lens 5 will reflect only the light emitted by the POD which propagates in the waveguide by total internal reflection. The light from the objects in the outside world (for example, the sun) will fall at lens 5 at angles in the low reflectivity range. Thus, the intensity of any possible ghost image caused by the outside objects will be reduced. Such a reflectivity depending on the incident angle can be implemented using, for example a multi-layer coating technology. Another potentially suitable technology is volume Bragg gratings that have a high diffraction efficiency only in a relatively narrow range of angles.

In some embodiments, as shown in FIGS. 11A-11C, lens 4 is configured such that image illumination propagating within the waveguide is convergent in a plane parallel to the waveguide's major external surfaces so as to converge towards a focal locus within the waveguide and then diverge before reaching lens 5. In some embodiments, lens 4 has an effective axis of cylindrical optical power that is optically parallel to the cylinder axis of lens 5.

Waveguide 2 further includes a coupling-out arrangement 3 for coupling out at least part of the collimated image illumination towards an eye of an observer. The coupling-out arrangement is shown herein by way of example as a set of mutually parallel partially-reflecting facets that are non-parallel (i.e. angled) with respect to the major parallel external surfaces of the waveguide. For brevity, the coupling-out arrangement is referred alternately referred to herein as light extraction area 3 or facets 3, although other types of coupling-out arrangements (e.g. diffractive elements) are also possible and included within the scope of this disclosure.

FIG. 11B shows an alternative embodiment in which lens 4 is integrated into POD 1. In this case, in order to achieve a good image quality, the plane to which the optical surface of lens 4 is orthogonal, should be parallel to the plane to which the optical surface of lens 5 is orthogonal (taking into account possible use of folding mirrors inside the POD).

FIG. 11C shows another alternative embodiment in which a specially-configured POD 1 that includes an elongated SLM providing a beam divergent in the waveguide plane from each pixel of the display, as will be explained in more detail with reference to FIGS. 28-33 below. The beam becomes collimated after reflection from lens 5. However, the beam provided by the POD 1 of this embodiment is not collimated in the plane orthogonal to the waveguide (as is the case in the prior art). The beam is shaped in such a way that it has aberrations equal in magnitude but opposite in sign to the aberrations of lens 5. In this way, the beam reflected from the lens 5 is collimated in both the waveguide plane and the orthogonal plane.

It should be noted that waveguide 2 can be a single waveguide, or a system of two or more optically coupled waveguides.

Having described the general embodiment and principles of operation of the disclosed waveguide system, numerous variant configurations will now be detailed.

Variant #1: Waveguide System with Polarization Control Elements

A polarized output of the projection optics may offer several advantages such as removal of some types of ghosts and a higher system efficiency. In this case, polarization control elements such as polarizers and quarter-wave plates can be integrated in the system to provide polarization management.

FIGS. 12A-12B show schematic representations of a top-down view and side view, respectively, of another embodiment of a waveguide system. In this embodiment, waveguide 2 includes an integrated quarter-waveplate 6 and polarizer 7. Quarter-waveplate 6 can be implemented, e.g., using a transparent polymer film attached to the surface of lens 5.

Assume that the light at the output of POD 1 is p-polarized relative to the plane of the facets. In this case, polarizer 7 should be configured to transmit p-polarized light, while the light extraction elements (e.g. facets 3) should be configured to reflect only s-polarization light. Light passes through waveplate 6, reflects off of lens 5, and passes a second time through waveplate 6, now becoming s-polarized. Facets 3, optimized for s-polarization reflectance, reflect the light out of the waveguide toward the EMB (not shown). The reflective properties of facets 3 or other light extraction element can be optimized for a particular polarization state of the light, using techniques well known in the art, e.g. polarization splitting coatings, etc.

In some embodiments, the quarter waveplate can be optimized to provide equal phase shift to rays within a given range of incident angles $\alpha1$-$\alpha2$, $0<\alpha1<\alpha2$, corresponding to the range of incident angles $\alpha1$-$\alpha2$ of rays in the waveguide In some embodiments, as shown in FIG. 12B, polarizers 8 can be bonded to the major external surfaces of the waveguide. In this case, the polarizers should preferably fully cover at least the light extraction area of the waveguide (represented in FIG. 12B as facets 3). The polarizers block light of the same polarization state as the light output from the POD 1. Thus, if the POD output is p-polarized, polarizers 8 should be configured to block p-polarized light and transmit s-polarized light.

Note that polarizer 7 (which transmits light of the same polarization as that emitted by the POD) should preferably be located between the light extraction area of the waveguide (in this case facets 3) and lens 4. Such a polarizer can be effective to block image "ghosts" created by multiple reflections between lens 5 and lens 4.

Figure 13A:
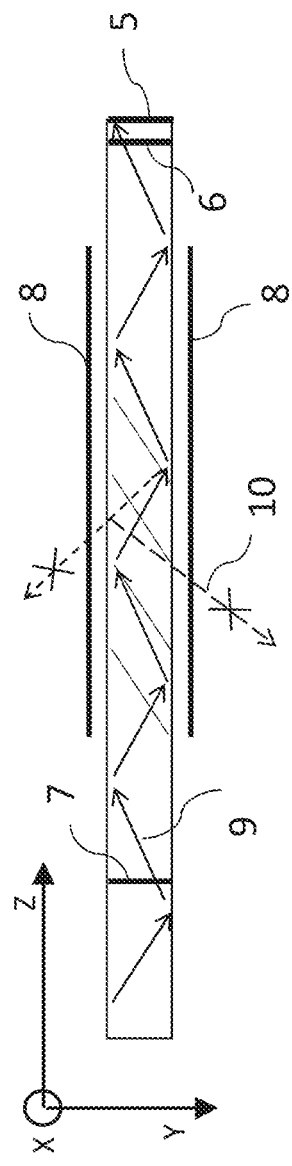
FIGS. 13A-13B show blocking of ghost rays according to an embodiment of a waveguide system.
Figure 13B:
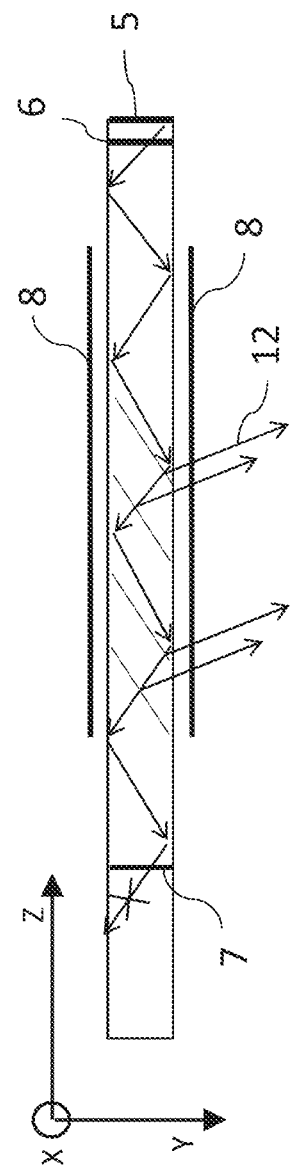

Referring now to FIGS. 13A-13B, the embodiment including polarizers 8 can be effective to block ghost rays 10 generated by forward propagating p-polarized rays 9 while still enabling back-propagating s-polarized light rays 12 to be extracted towards the EMB (not shown).

The polarizers described herein with reference to FIGS. 12A-13B can also be used in other waveguide systems described herein.

Variant #2: Waveguide System Including a Mixer

In some embodiments it may be desirable to reduce the aperture of the POD in the direction orthogonal to the waveguide plane, for example, in order to reduce optical aberrations and/or to make the POD module more compact. However, such an aperture reduction may result in black lines in the observed image as the waveguide aperture is not filled completely.

Figure 14B:
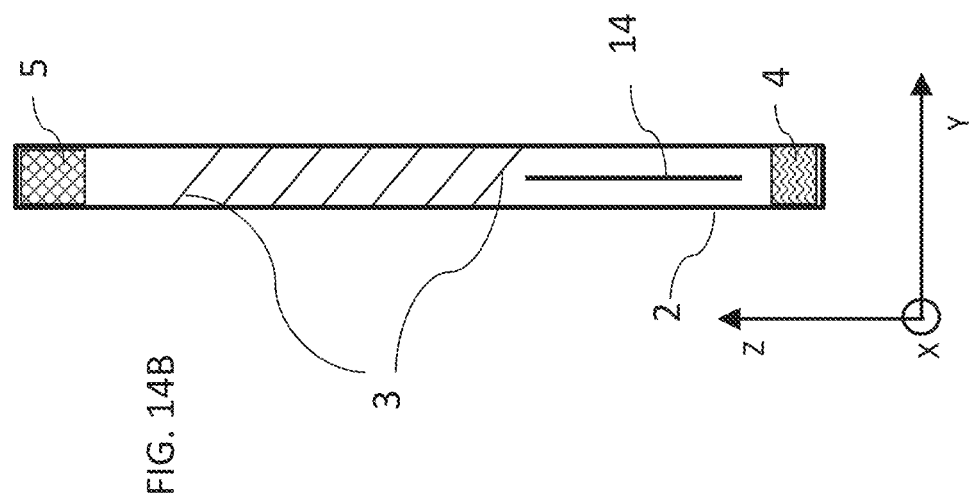
FIGS. 14A-14B show schematic representations of an embodiment of a waveguide system including a mixer.
Figure 14A:
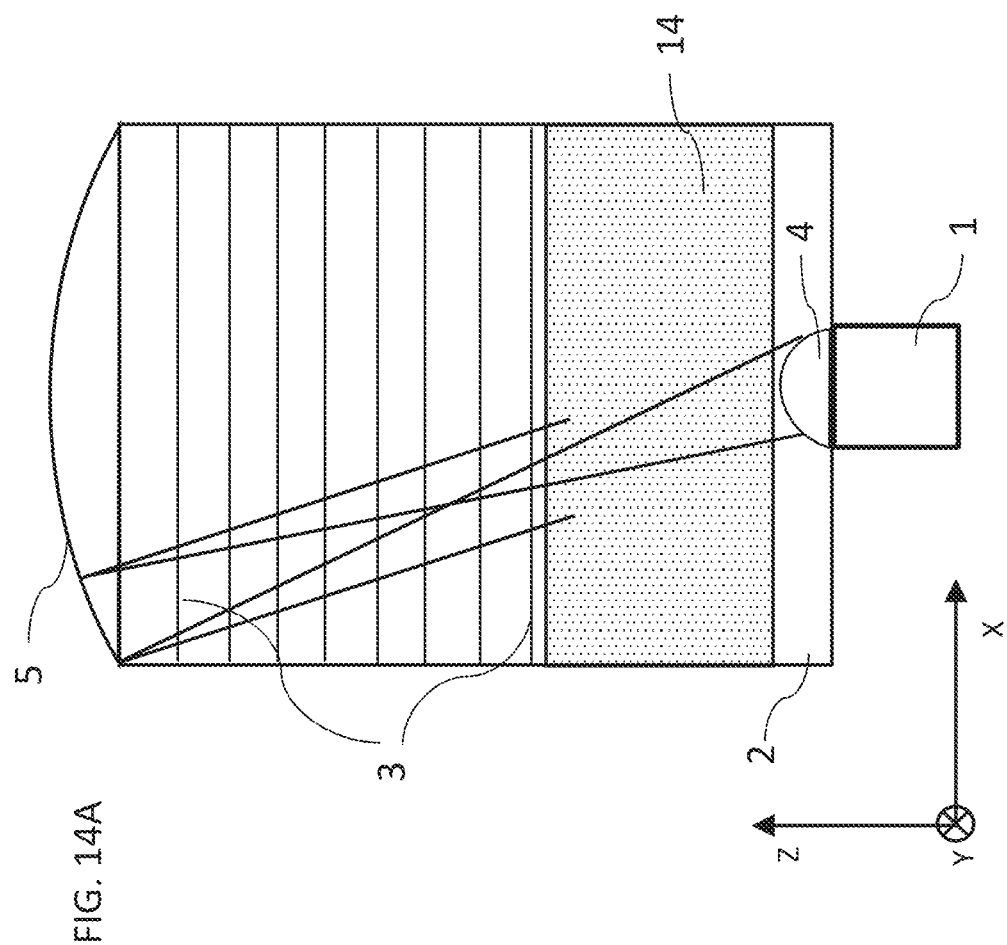

FIGS. 14A-14B show schematic representations of a top-down view and side view, respectively, of another embodiment of a waveguide system. Waveguide 2 includes an optical mixer 14, in this case implemented a semi-reflective surface parallel to the major external surfaces of the waveguide. The mixer splits the light beam propagating in the waveguide and directs the split beam to the waveguide aperture regions not filled by the POD.

Mixer 14 is preferably implemented as a non-absorbing surface with approximately 50% reflectivity for the light propagating inside the waveguide, and with a relatively low reflectivity for the light entering the waveguide from outside the system, such that display transparency is not decreased. The mixer is preferably located between lens 4 and the light extraction area 3.

It should be noted that the use of a mixer is not limited to any specific system described here, but can in fact also be incorporated into the other embodiments described in this document.

Variant #3: Double Mirror System

Figure 15C:
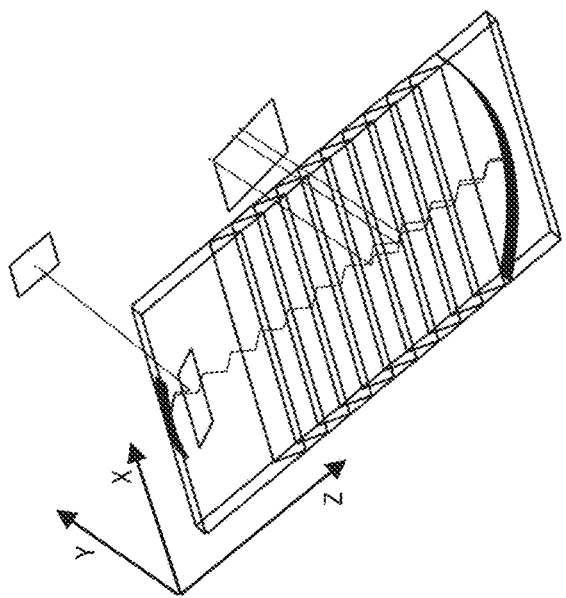
FIGS. 15A-15C show schematic representations of an embodiment of a waveguide system including a beam splitter mirror.
Figure 15B:
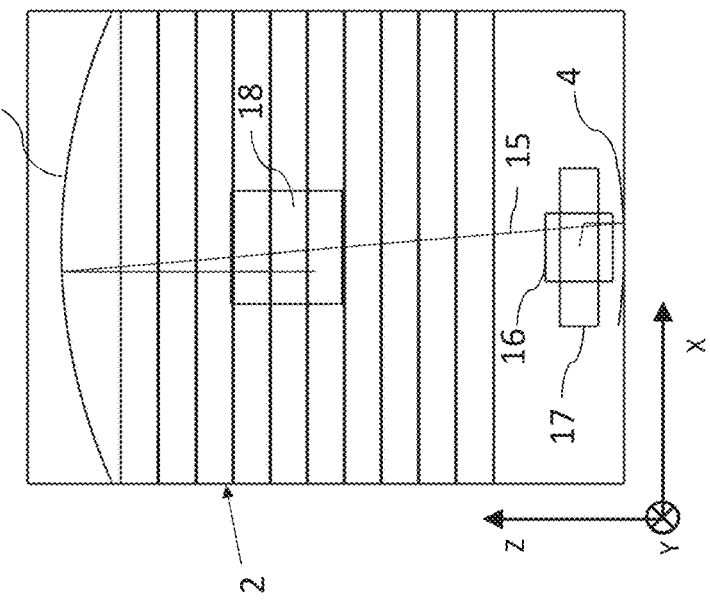
Figure 15A:
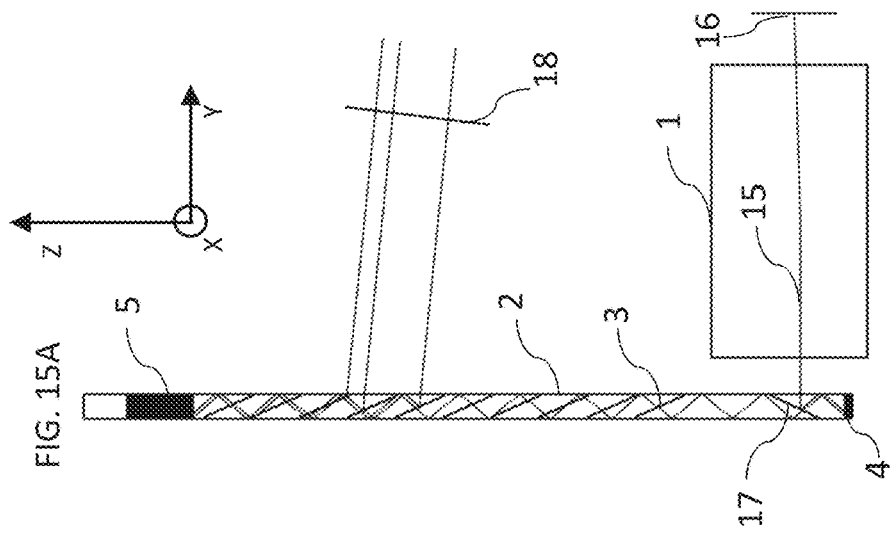

FIGS. 15A-15C show schematic representations of a top-down view, side view, and top-perspective view, respectively, of another embodiment of a waveguide system. In this embodiment, waveguide 2 includes a beam-splitter mirror 17. Beam-splitter mirror 17 may be a polarization beam splitter (PBS) that can optimize light coupling efficiency if the output of the POD 1 is polarized. Ray 15 is emitted by an image source 16 and propagates through the POD 1, which outputs a collimated beam of light for a given point in the FOV. Ray 15 is coupled-in to the waveguide by beam-splitter mirror 17. Ray 15 propagates through the waveguide towards lens 4 (now acting as a focusing element). After reflection from lens 4, the ray propagates through facets 3 towards lens 5 (acting as a collimating mirror). Upon reflection from lens 5, the ray propagates back through the waveguide in the opposite direction. Facets 3 eject a portion of the energy carried by the ray 15 towards EMB 18.

Figure 16:
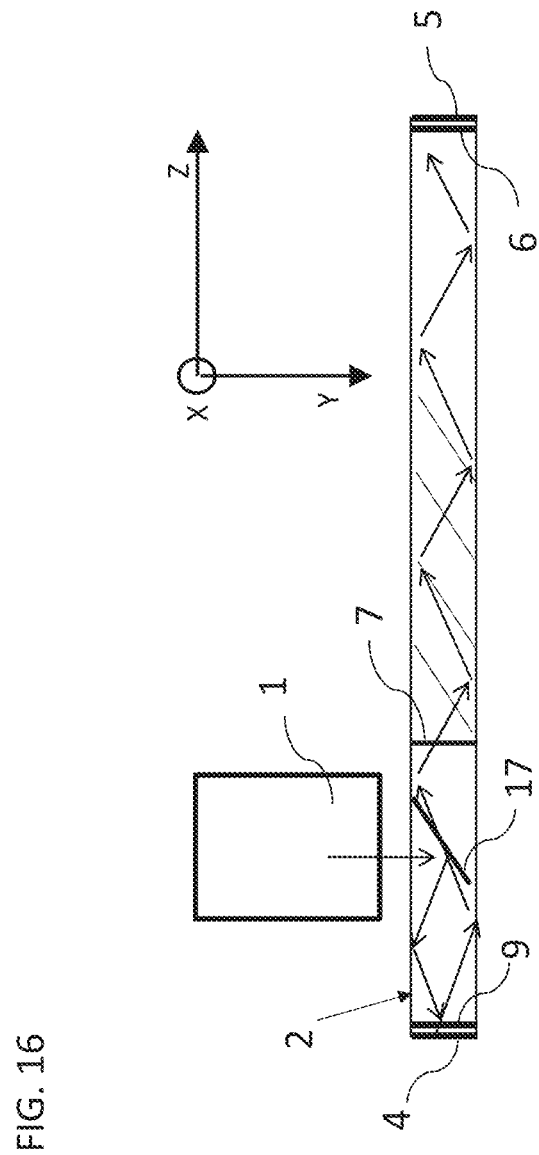
FIG. 16 shows a variant of the system shown in FIGS. 15A-15C including polarization control elements.

FIG. 16 shows a variant configuration of waveguide 2 that includes PBS 17 combined with quarter-waveplates 6, 9 and a polarizer 7, as was discussed above with reference to FIGS. 12A-14B.

Figure 17:
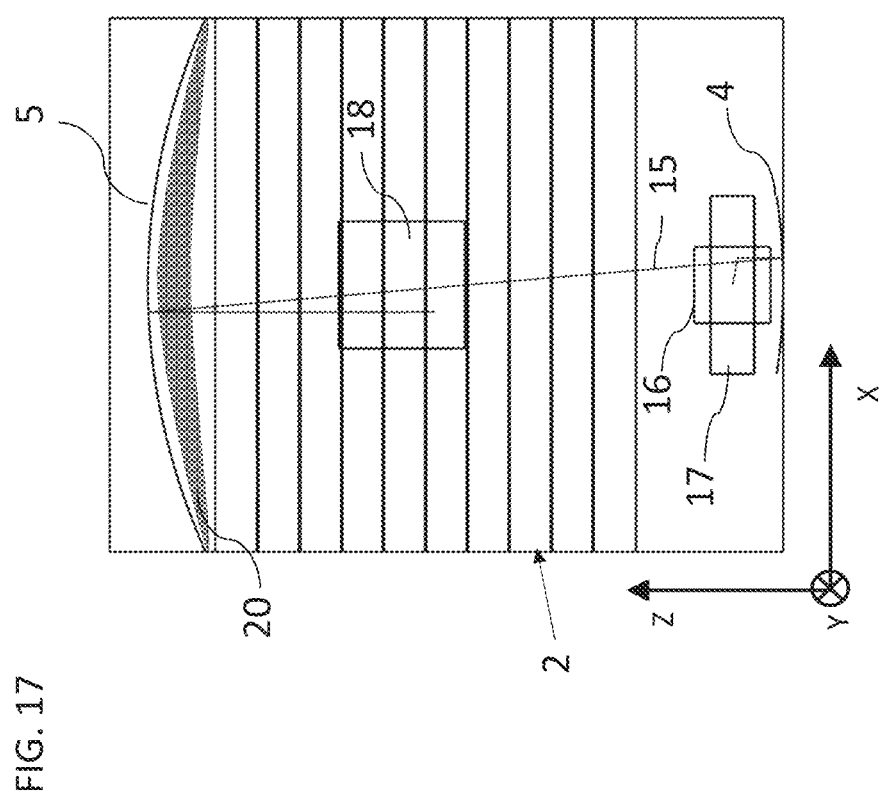
FIG. 17 shows a further variant of the system shown in FIGS. 15A-15C including refractive cylinder elements.

FIG. 17 shows a further variant of the general system of FIG. 15 including one or more refractive cylinder elements 20. A refractive cylinder element ("lens") 20 can be used to correct aberrations of the double-mirror system in the waveguide plane. Lens 20 is preferably made of a material with a different refractive index as compared to the refractive index of the waveguide substrate, and may have a convex or concave shape. Lens 20 can also be a combination of two or more lenses made of different materials. In a similar fashion, lens 4 can also be used in combination with one or more refractive elements.

Lenses 4 and 5 and any of the refractive elements may have a cylinder, swept-conical (a shape obtained by sweeping a 2D conic curve along the direction normal to the waveguide plane) or free-form 2D shape for achieving a better image quality in the system. A Fresnel lens can also be used in a combination with any of the above elements (i.e. lenses 4, 5 or 20).

Variant #4: Diffractive Optical Elements

Figure 18:
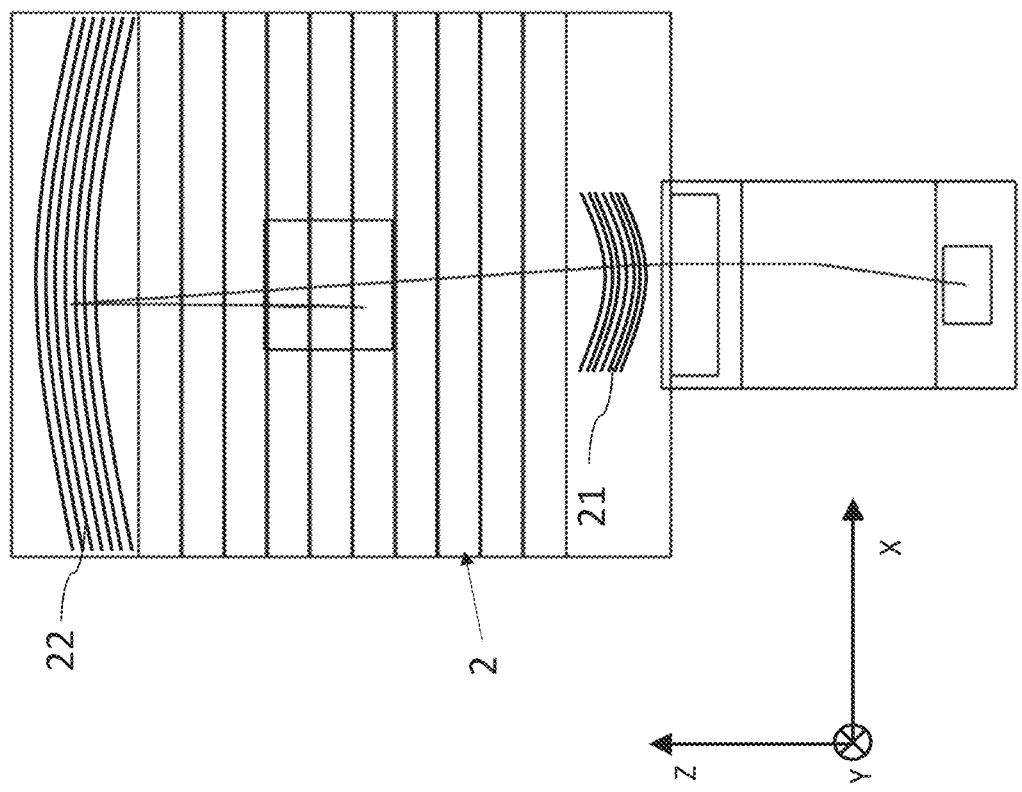
FIG. 18 shows a schematic representation of an embodiment of a waveguide system including diffractive elements.

FIG. 18 shows a schematic representation of another embodiment of a waveguide system. In this embodiment, the 2D imaging in the plane of the waveguide is implemented using diffractive optical elements 21 and 22. In this case the function of the diffractive elements is similar to the function of an optical element such as a lens (including a mirror). In some cases, more than two diffractive elements can be used depending on a particular design of the imaging system.

It will be appreciated that a diffraction element such as 21 or 22 shown cannot be made infinitesimally small in the z-direction, and as such will introduce aberrations in the plane of the waveguide. In order to compensate for such aberrations, the optical power of the diffractive elements should preferably be non-uniform along the z-axis. Such diffractive elements can be implemented, for example, as surface relief diffraction gratings with curved grooves on the surface of the waveguide. As the waveguide in principle does not have to be transparent at the ends, the gratings can be covered with a reflective coating, and the pitch of the grating can be made such that only the diffraction orders $0^{th}$ and $1^{st}$ exist, thus the diffraction efficiency in the $1^{st}$ order can be maximized.

Alternatively, Bragg gratings can be used as diffractive elements 21 and 22 for high diffraction efficiency. As Bragg gratings show a high angular selectivity, more than one Bragg grating can be used to implement each of the elements 21 and 22. Alternatively, polarization Bragg gratings can be implemented as elements 21 and 22, and use only a selected polarization for imaging.

Figure 19:
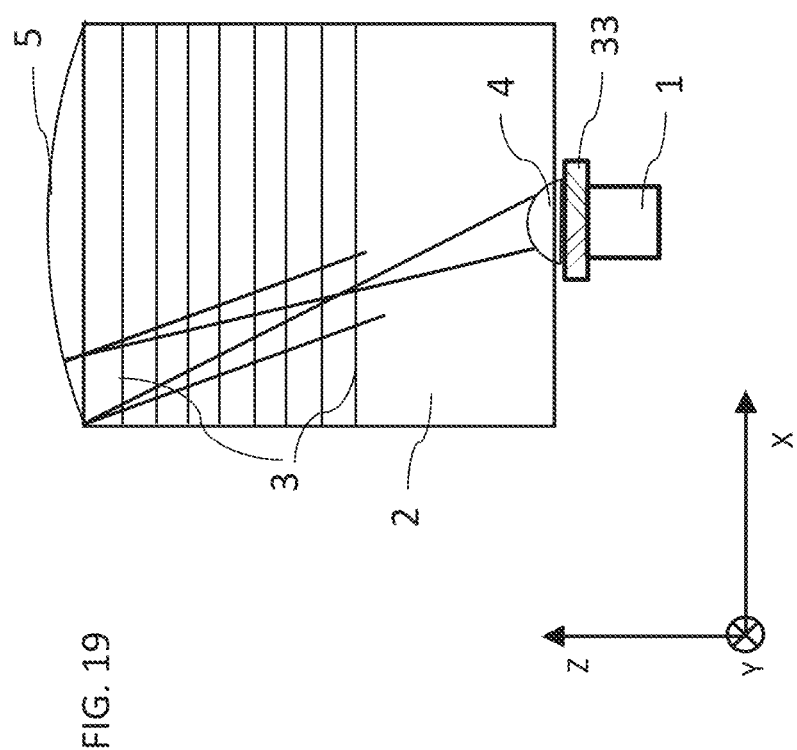
FIG. 19 shows a schematic representation of an embodiment of a waveguide system including a second waveguide.

Variant #5: Projection Optics Aperture Expansion with an Additional Waveguide FIG. 19 shows a schematic representation of another embodiment of a waveguide system. In this embodiment, POD 1 can be combined with a waveguide 33 of the type disclosed in U.S. Pat. No. 7,643,214. As shown in FIG. 19, this arrangement can be used to expand the optics aperture in a dimension parallel to the plane of waveguide 2. This arrangement may be beneficial to increase the size EMB (not shown) in the x-dimension.

Variant #6: Etendue Expander

Figure 20C:
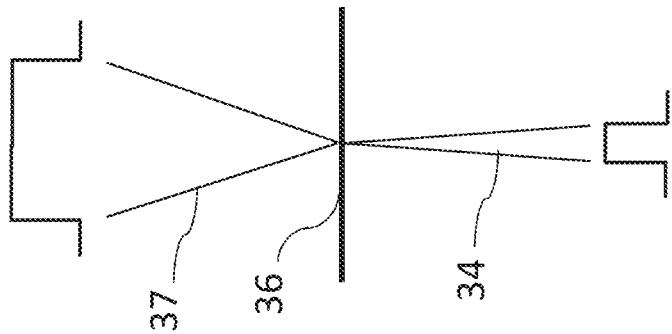
FIGS. 20A-20C show schematic representations of an embodiment of a waveguide system including an etendue expander.
Figure 20B:
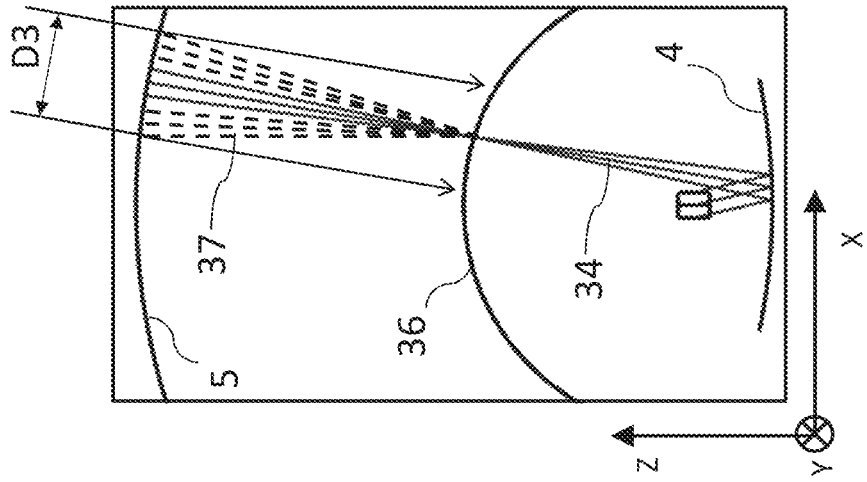
Figure 20A:
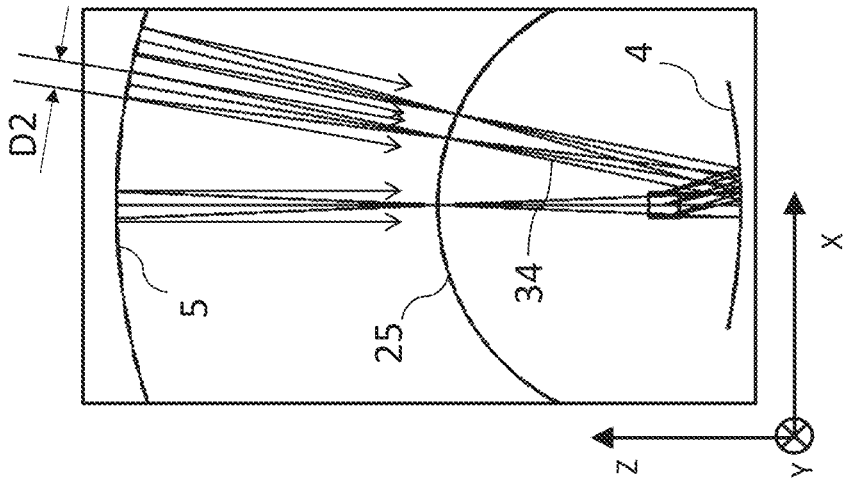

FIGS. 20A-20C show schematic representations of another embodiment of a waveguide system. In this embodiment, the waveguide system includes an optical etendue expander. The etendue expander is preferably integrated with the waveguide at the focal locus of the waveguide. The etendue expander is preferably configured to expand the image in a plane parallel to the waveguide's major external surfaces without broadening the image in a plane perpendicular to the major external surfaces.

Referring back to FIGS. 11A-11B, note that the width of the beam D2 at lens 5 must be equal to or larger than the width of EMB. The relationship between D2 and the POD aperture width D1 and is given by Equation 1:

$$D2 = D1 \times \frac{f2}{f1} \quad (1)$$

At the same time, the relationship between the FOV of the system (FOVs) and the FOV of the projection optics (FOVo) is given by Equation 2:

$$FOVs = FOVo \times \frac{f2}{f1} \quad (2)$$

The width of the EMB and FOVs are fixed parameters. Therefore, assuming that D2 equals the width of the EMB ("$W_{EMB}$"), the condition that must be satisfied for the projection optics FOV and aperture width 1 is expressed in Equation 3:

$$D1 \times FOVo = W_{EMB} \times FOVs \quad (3)$$

Thus, the optics aperture width can be made smaller than the width of the EMB only at the cost of increasing the projection optics FOV. This limits the potential to the miniaturization of the projection optics and also makes the optics design challenging, because a large aperture implies a low F# of the projection optics.

Having described the problem, the inventors propose the following solution. As can be seen in FIGS. 11A-11B, lens 4 forms an intermediate image within the waveguide along a virtual curve 25. This is further illustrated in FIG. 20A, showing light 34 focused in the plane of the waveguide to a point inside the waveguide. The beams corresponding to different FOVs are focused to points along a virtual curve 25. Assume that an optical element 36 (referred to herein as "etendue expander") that transforms the light in one dimension parallel to the waveguide plane is placed at the location of virtual curve 25 as shown in FIG. 20B. Etendue expander 36 can be a one-dimensional diffuser, a diffraction grating or an array of cylinder micro-lenses. Etendue expander 36 increases the angle of the cone of rays falling on the etendue expander in the waveguide plane. In other words, the etendue expander increases the numerical aperture (NA) of the beam or decreases the F# ("f-number") of the system in the waveguide plane. This optical function is achieved either by scatter in the case of a diffuser, by diffraction in the case of a grating, and by optical power in the case of a micro-lens array (MLA) as detailed below with reference to FIGS. 21A-21B.

Figure 21B:
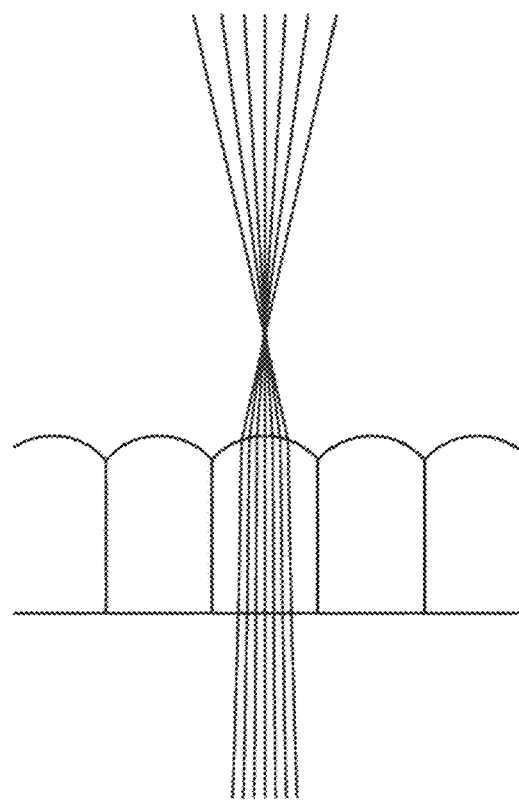
FIG. 21A shows a converging beam of light with a small numerical aperture falling on a micro-lens array.
Figure 21A:
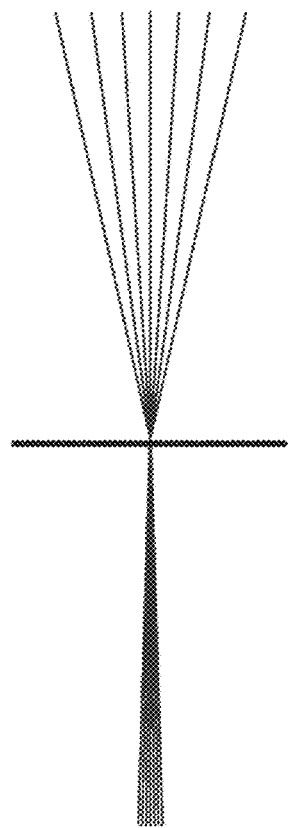

FIG. 21A shows a converging beam of light with a small numerical aperture (NA) falling on a MLA from the left. The NA of the beam that has passed through the MLA and propagates further to the right is significantly larger as compared to the NA of the beam on the left of the MLA. FIG. 21B shows a magnified view of the rays passing through one of the micro-lenses of the MLA. As one can see, in order to achieve an increase of the NA of the beam, the MLA should be placed slightly out of focus of the converging beam. If such a MLA is used as an etendue expander 36, each micro-lens becomes a pixel of the image projected in the eye of the user. Therefore, the micro-lenses should preferably be sufficiently small so they are not resolved in the resulting image.

For simplicity, assume a diffraction grating is used as the etendue expander. In this case, each of the rays in the beam 34 in FIG. 20A produces several diffracted rays. All the rays in the original beam 34 and the respective diffracted rays form a beam 37, with a larger angular divergence. Therefore, the width D3 of the beam after reflection from the lens 5 can be made significantly larger as compared to the width D2 in a system without a diffuser, diffraction grating or MLA. It is important that the angular distribution of energy in the diffracted beam 37 is uniform as shown in FIG. 20C. A non-uniform energy distribution may result in a non-uniform image observed by the system user and variation of the image brightness over the EMB. In addition, the divergence of the beam shall not be too large to avoid generation of stray light.

It should be noted that the described approach of etendue expansion does not sacrifice the FOV of the system, and potentially enables as small an aperture of the POD as is allowed by the diffraction limit.

It should be further noted that the etendue expander 36, when implemented using a diffuser or grating, may in some cases be visible to a viewer of the display system. In this case, it may be desirable to use a polarization sensitive grating or diffuser which can then be made invisible to the viewer.

Figure 22A:
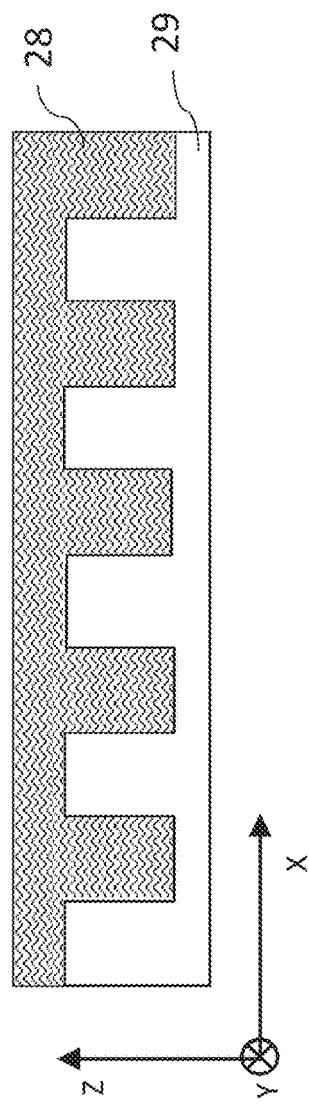
FIGS. 22A-22B show various embodiments of a polarization selective etendue expander.
Figure 22B:
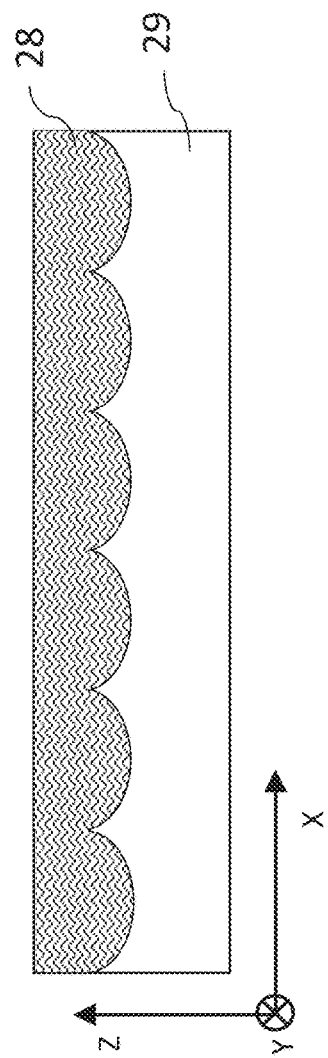

For example, assume that the system shown in FIGS. 20A-20C includes polarization control elements similar to those shown in FIGS. 12A-13B. Further assume that the POD output is p-polarized relative to the plane of the facets, and polarizers 8 (FIGS. 12A-13B) transmit s-polarization. Thus, if the diffuser or grating etendue expander 36 only diffuses or diffracts p-polarized light, the viewer will not see the diffuser or grating. Such a polarization sensitive grating (or diffuser) can be made, for example, using a polarization Bragg grating (or a combination of those) or structures shown in FIG. 22A, and which consists of two matching parts 28 and 29. Part 29 is an optically transparent homogeneous material, and part 28 is made of a uniaxial birefringent material, for example a liquid crystal. The refractive indices of the parts 28 and 29 should match for s-polarization and differ for p-polarization (relative to the plane of the facets). When implemented this way, the grating diffracts p-polarized light and does not impact the s-polarized light. The same mechanism of polarization sensitivity is applicable to a polarization sensitive diffuser. Alternatively, as shown in FIG. 22B, an array of cylinder micro-lenses can be used to refract p-polarized light while having no impact on s-polarized light.

Variant #7: POD with Integrated Focusing Element with an Optional Biconic Mirror FIGS. 23A-31 show schematic representations of another embodiment of a waveguide system. In this embodiment, lens 4 is integrated into the POD, such that the beam injected into the waveguide is already focused in the waveguide plane, which may reduce manufacturing costs of the waveguide.

Figure 23C:
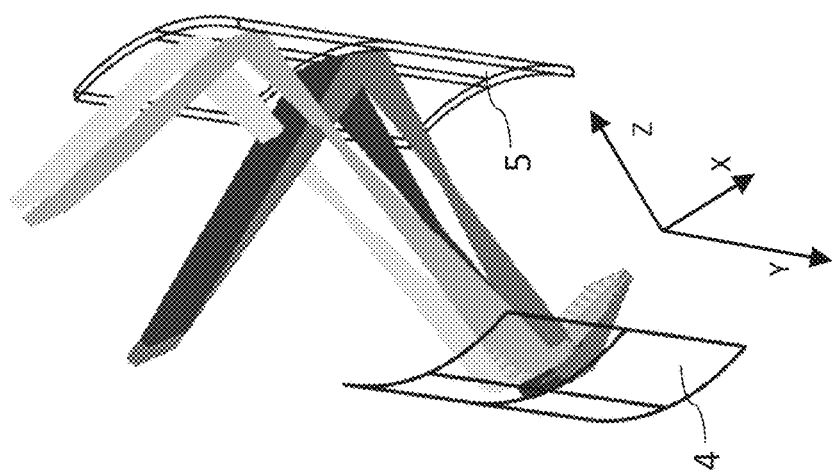
FIGS. 23A-23C show schematic representations of an embodiment of a waveguide system with a focusing element in the POD.
Figure 23B:
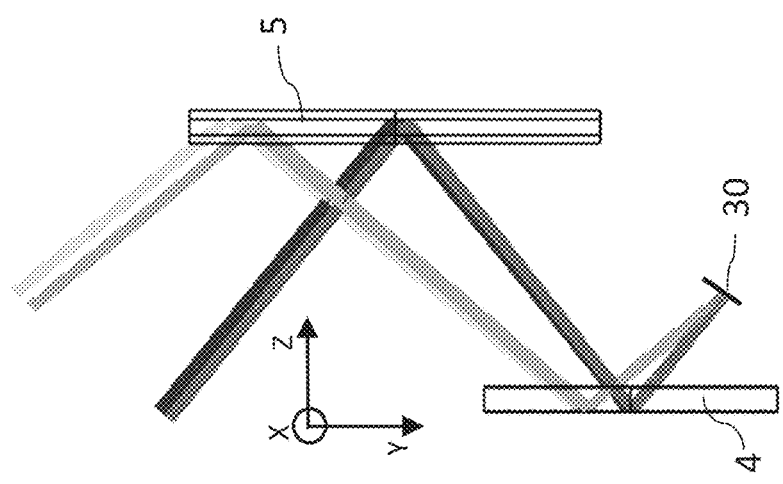
Figure 23A:
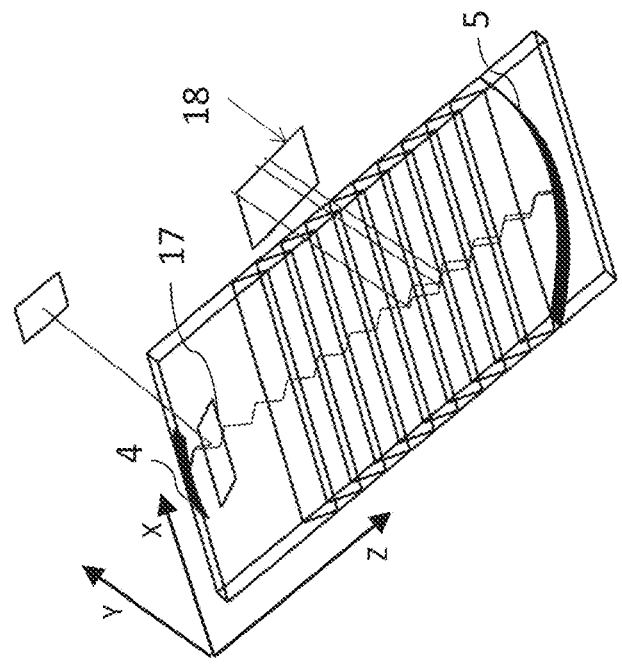

By way of context, FIG. 23A shows an isometric view of a waveguide in which lenses 4 and 5 are integrated in the waveguide (similar to FIG. 15C). FIGS. 23B and 23C show the unfolded light paths in the system for the four different FOVs. FIG. 23B shows a stop aperture 40 ("stop"), which may coincide with the output aperture of the POD or with an imaginary or real plane in the waveguide or the plane of the light input wedge. Also, the stops in the x- and in y-directions do not necessarily coincide.

Figure 24B:
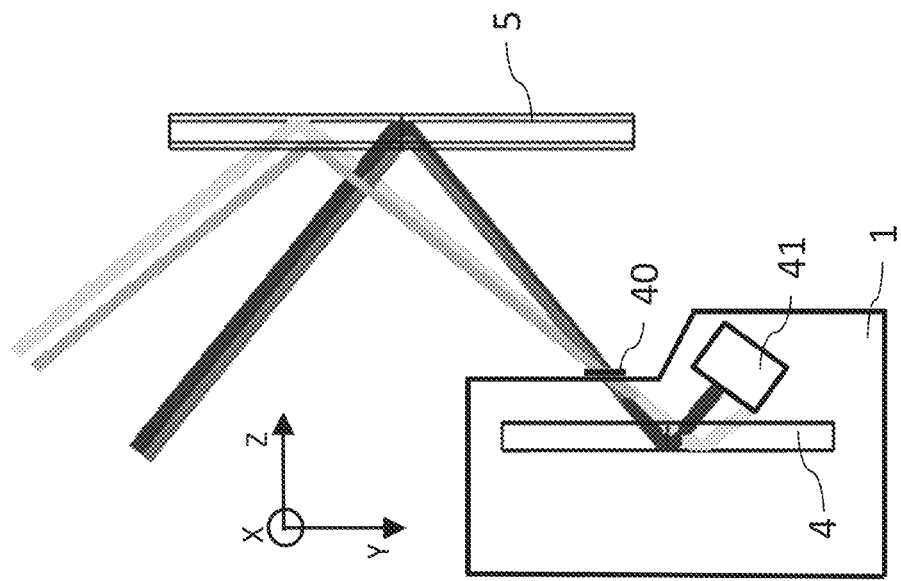
FIGS. 24A-24B show the location of the stop according to various embodiments.
Figure 24A:
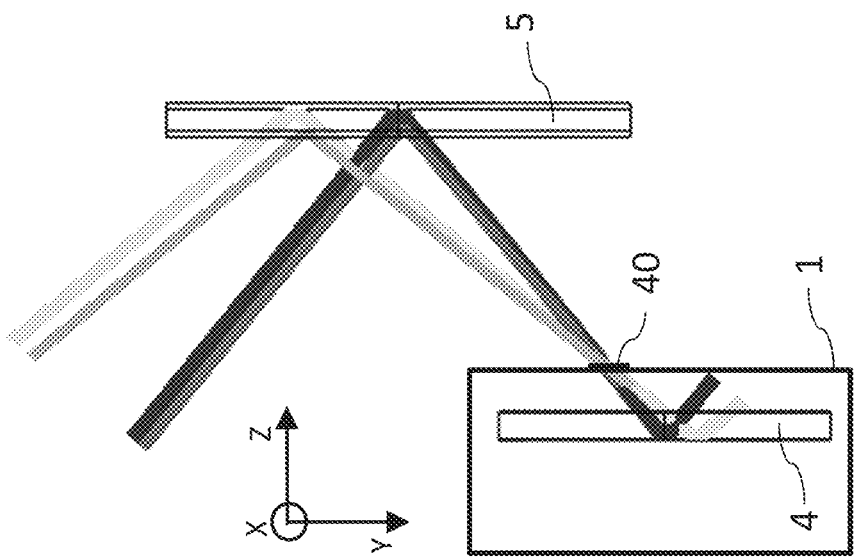

FIG. 24A shows a system in which the stop 40 is located between lenses 4 and 5. The part of the system including the stop and lens 5 can be folded and integrated in the waveguide, such that the plane of the stop 40 is located at the waveguide end. The part of the system including lens 4 can be integrated in POD 1, such that the exit aperture of the POD coincides with stop 40. The light path can be further folded inside the POD. However, the angle of incidence of the rays on lens 4 should not change because of this folding. Otherwise there will be an aberration caused by the cylinder optical power of lens 5, as illustrated in FIGS. 6, 7 and 11.

FIG. 24B shows an alternative implementation of the system shown of FIG. 24A in which POD 1 includes an optics module 41, which outputs collimated beams towards lens 4.

It should be noted that stop 40 works as a stop along the y-axis, as it coincides with the waveguide entrance. The aperture that limits the rays in the direction of x-axis can be located at the stop 40 or elsewhere.

In some embodiments, the POD may include additional optical elements for minimization of the optical aberrations, such as cylinder, biconic, spherical, aspheric or freeform lenses or mirrors made of the same or different optical materials.

FIGS. 25A-25B show top and side views, respectively, of a system in which lens 4 is implemented as a biconic mirror within POD 1. The system of FIGS. 25A-25B includes a display 32 with a polarizer, each pixel of which emits a polarized light towards the lens 4 through PBS 33. Lens 4 is combined with a quarter waveplate such that the polarization of the reflected light is rotated 90 degrees. The light reflected by lens 4 is subsequently reflected by PBS 33 and is injected into the waveguide through stop 40 at the waveguide edge.

It should be noted that POD shown in FIGS. 25A-25B does not fill the waveguide aperture (in the plane normal to the waveguide). Hence, a mixer 14 is used to fill the waveguide aperture.

FIGS. 26A-26B show top and side views, respectively, of a system similar to FIGS. 25A-25B now including an etendue expander 36, which enables the reduction of the projection optics aperture in the plane of the waveguide (along x-axis).

In some embodiments, the systems of FIGS. 25A-26B can further include polarization control elements such as polarizers and a quarter waveplate, as described above with reference to FIGS. 12A-13B.

Figure 27:
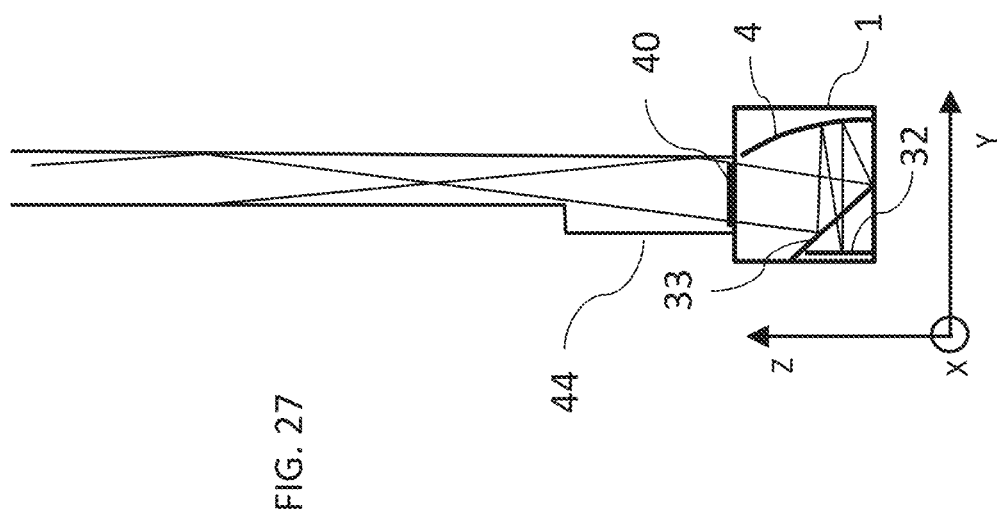
FIG. 27 shows a schematic representation of an embodiment of a waveguide system with a large POD aperture.

It should be noted as well that the POD aperture can be larger than the waveguide thickness along the y-axis, as shown in FIG. 27. In this case, the waveguide is thicker at the coupling-in end to provide a larger entrance aperture 44. In some cases a large aperture can be used instead of, or in addition to, a mixer.

Figure 28:
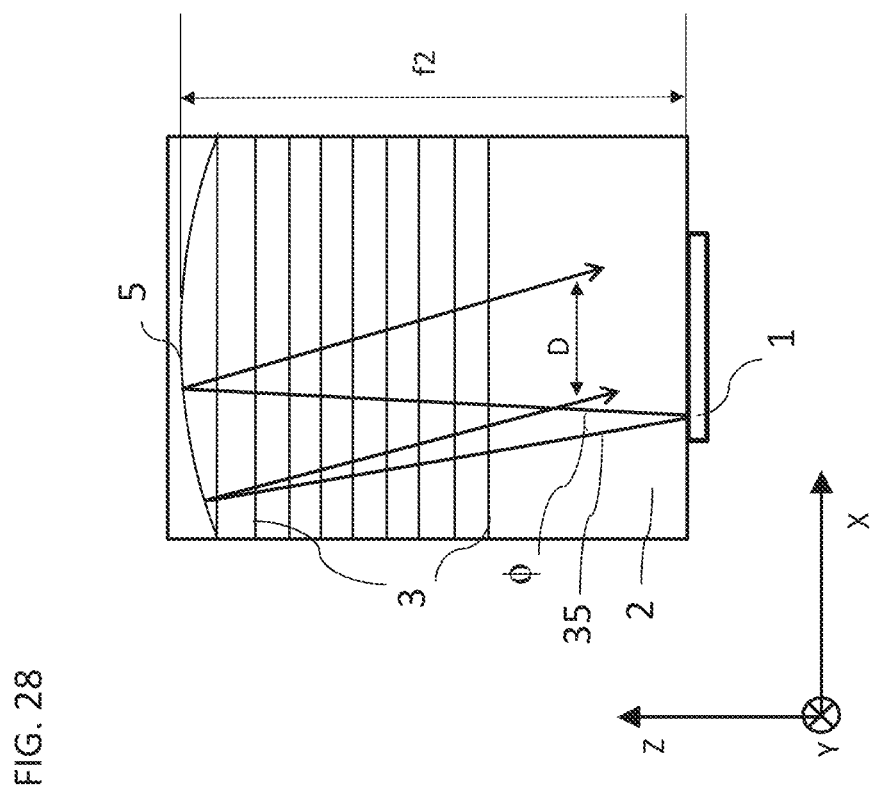
FIG. 28 shows a schematic representation of an embodiment of a waveguide system including cylindrical optical surfaces in the POD.

Variant #8: Optical System with Cylinder Optical Surfaces in the Projection Module FIGS. 28-33 show schematic representations of another embodiment of a waveguide system, in which the intermediate optical arrangement is integrated in the POD. In this embodiment, the waveguide system includes cylindrical optical surfaces in the POD. Referring now to FIG. 28, showing a schematic representation of a top view of a system according to this embodiment, POD 1 is optically coupled to waveguide 2. Waveguide 2 includes one or more light extraction elements 3 (shown as a plurality of partially reflective facets). The waveguide further includes lens 5 having focal length f2. Referring now to FIG. 29A, showing a schematic representation of a side view of a system according to this embodiment, POD 1 includes an image source 104 positioned in the focal plane of lens 5. Light beam 35 emitted by a pixel of the image source is collimated in the plane orthogonal to the waveguide by collimating optics (not shown in FIG. 28). The light beam propagates through waveguide 2 towards the lens 5. Upon reflection from lens 5, the light becomes collimated in the plane of the waveguide, propagates back through the waveguide and is directed by the facets toward the EMB (not shown).

Note that upon exiting POD 1 the divergence of the beam 35 in the plane of the waveguide is defined by the focal length of the lens 5 and the desired width D of the EMB:

$$\varphi = 2 \times \operatorname{atan}\left(\frac{D}{2 \times f2}\right) \quad (4)$$

The larger the angle φ, the larger the optical aberrations of the rays at the edges of the beam aperture caused by the cylinder mirror 5. As such, the larger the EMB, the worse image quality as seen by the user when the user's pupil is at an edge of the EMB. The image source angular aperture shall not significantly exceed the value given by Eq. (4), as otherwise a part of the light will be directed outside the EMB, which would result in lower energy efficiency of the system.

Image source 104 can be, e.g., a micro-LED display, SLM, etc. For the purposes of FIG. 28, image source 104 is assumed to be a SLM. POD 1 includes illumination system 200, and prisms 102, 105 with PBS 103 sandwiched therebetween. POD 1 further includes SLM (e.g. LCOS, etc.) 104, quarter waveplate 106 and cylinder mirror 107. Polarized light from the illumination system 200 enters prism 102 and is reflected by PBS 103 towards SLM 104. The modulated light reflected by SLM 104 has a 90 degrees rotated polarization state, so it is directed through PBS 103 to prism 105 towards the cylinder mirror 107. Quarter waveplate 106 between prism 105 and mirror 107 rotates the polarization of light reflected by cylinder mirror 107 by 90 degrees. The reflected light re-enters prism 105 and is reflected by PBS 103 towards waveguide 2.

The image source 104 is preferably an elongated SLM having a length that is at least five (5) times greater than its width, and is deployed with its length aligned parallel to the waveguide's major external surfaces. Preferably, the SLM has an effective pixel area that is oblong, with a first pixel pitch parallel to the length of the SLM, and a second pixel pitch smaller than the first pixel pitch parallel to the width of the SLM, as will be detailed below. Preferably, each physical pixel element for the SLM is smaller than the first pixel pitch and larger than the second pixel pitch, with a plurality of physical pixel elements being staggered within each first pixel pitch, as will be further detailed below.

In some embodiments, the cylinder mirror 107 and lens 5 can have a cylinder shape, an aspheric or a free-form shape, or any combination of the above.

In some embodiments, the aperture of POD 1 in the y-direction can be made smaller than the aperture dimension required to fill the entrance aperture of waveguide 2. In this case, in order to completely fill the waveguide aperture, mixer 14 can be used as previously described.

In some embodiments, as shown in FIGS. 29A-29B, the mixer can be located between the POD and the light extraction elements 3 (shown here as facets), while the facets are located between the mixer and lens 5. In another embodiment, the mixer can be located between lens 5 and the facets, while the facets are located between the POD and the mixer.

In yet other embodiments, the system can include two mixers (not shown), in which one is located between the POD and facets while the other is located between lens 5 and the facets, such that the facets are located between the two mixers.

In some embodiments, in order to prevent image ghosting resulting from back-reflected light in the waveguide, a polarizer 108 can be used between the prism 105 and the waveguide at the waveguide aperture, and a quarter waveplate 106 is placed in front of the lens 5. Thus, the polarization of the back-reflected light is rotated 90 degrees and is blocked by polarizer 108. Such a rotation of polarization is also beneficial for optimizing reflectivities of the facets for a selected polarization of light as previously described.

In some embodiments, as shown in FIG. 29A, the waveguide can include cover plates 46 bonded to the parallel external surfaces. In this case, polarizers can be implemented in front of cover plates 46 (in a similar fashion as shown in FIGS. 12A and 13B). The polarizer in front of the cover plate 46 which is farthest from the user of the display system (left side of waveguide 2 in FIG. 29A) can block the light ejected by facets 3 that is directed away from the user.

The polarizer in front of the cover plate 46 closest to the user (right side of waveguide 2 in FIG. 29A) can block ghost light reflected toward the user by the surface of the opposite cover plate 46 (i.e. the cover plate on the left side of the waveguide in FIG. 29A).

FIGS. 30A-30B show various alternative arrangements of the components described above within POD 1. The path of the light is shown by the solid arrows.

Figure 31:
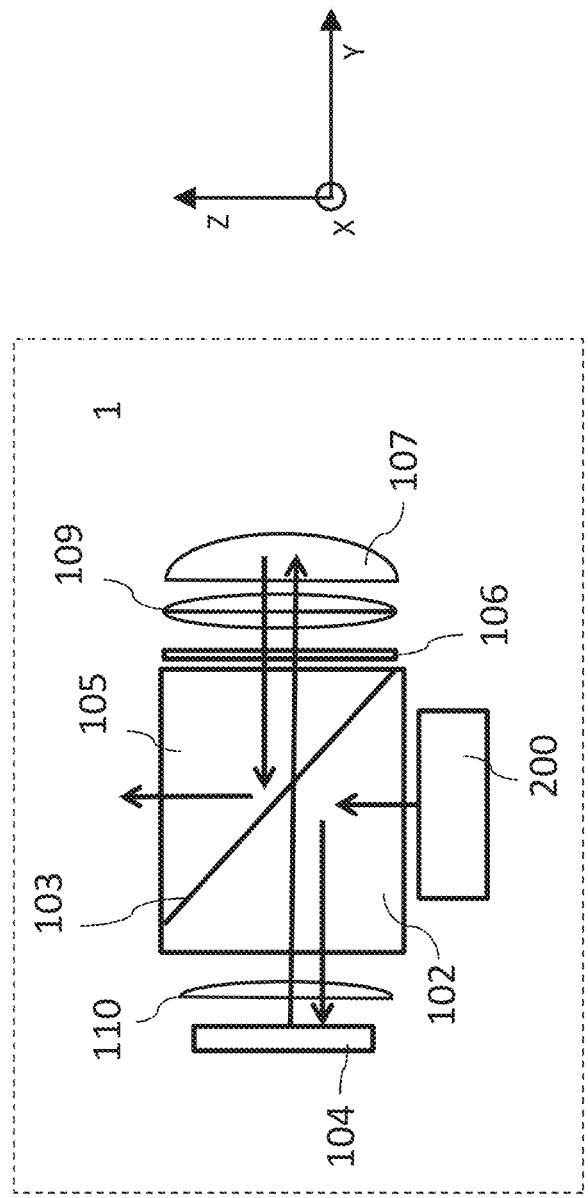
FIG. 31 shows a schematic representation of an embodiment of the system of FIG. 28 including an additional cylinder lens.

FIG. 31 shows a further embodiment of the POD 1 in which an additional cylinder lens 109 (or a combination of cylinder lenses, such as an achromatic cylinder doublet) and a cylinder lens (or lenses) 110 are used for improving the image quality.

It should be noted that in FIGS. 28-31, the focal length f2 of the lens 5 is much larger compared to the focal length f1 of the collimating optics in POD 1 (i.e. the cylinder mirror 107 in FIGS. 29A, 30A and 30B, or mirror 107 in combination with cylinder elements 109 and 110 in FIG. 31).

The angular resolution of an eye in the x-dimension and y-dimension, respectively (dx, dy) is translated into dimensions of the resolvable pixel in the image source plane as:

$$dx = f2 \times \delta\theta/n2 \quad (5)$$
$$dy = f1 \times \delta\theta/n1$$

Figure 32:
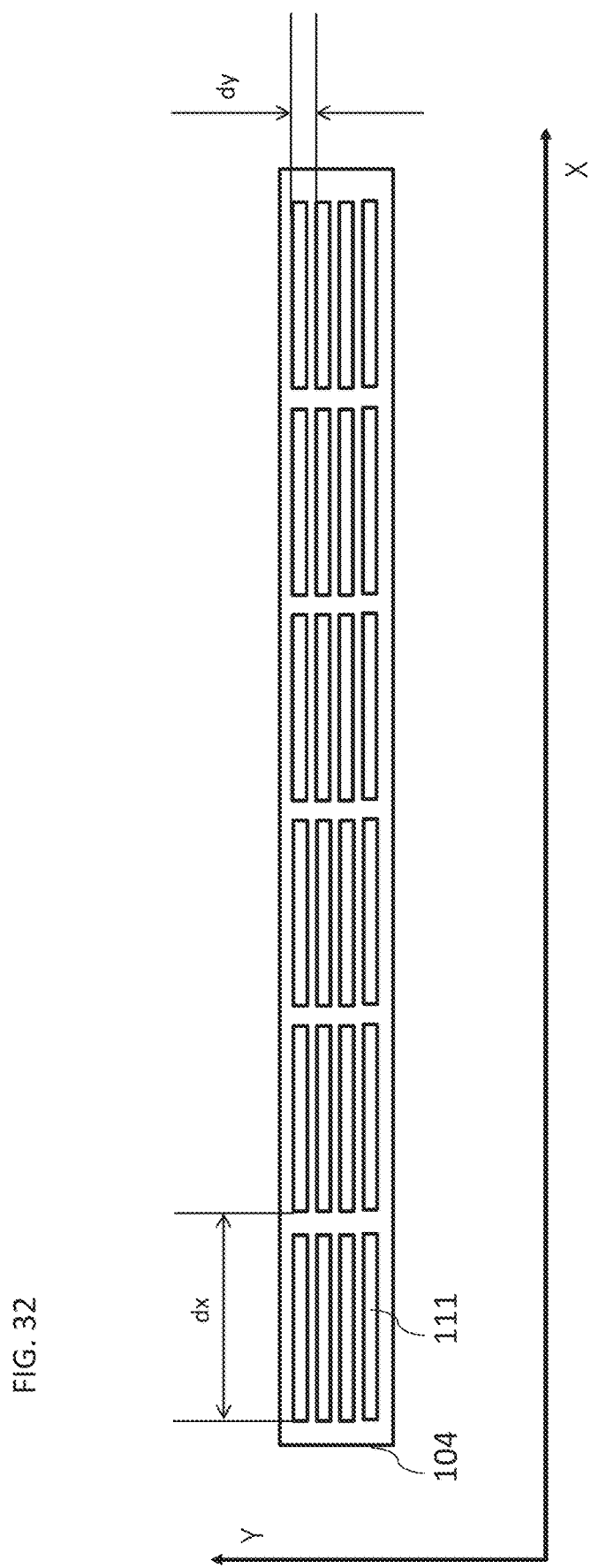
FIG. 32 shows an existing pixel arrangement of an image source.

In Eq. (5), n1 refers to the refractive index of the material of POD 1, while n2 refers to the refractive index of the material of waveguide 2. As follows from Eq. (5) the resolvable spot in the image source plane is a rectangle, with dx>>dy (i.e dx is significantly larger than dy). FIG. 32 shows a pixel arrangement of an image source such as a SLM or micro-LED display that uses rectangular pixels 111 due to the different spatial resolutions of dx and dy. Rectangular pixels have been described in prior art, though the link between the pixel dimensions and the resolution of an eye have not been established.

As can be seen from FIGS. 28 and 31, the focal length f1 defines the minimum possible size of the POD. Thus, a more compact POD requires a smaller f1 and consequently a smaller pixel pitch according to Eq. 5). However, the smallest pixel pitch is limited by current display manufacturing technology, and at the present time is limited to around 3 microns. From Eq. (5), it can be estimated that the minimum possible focal length f1 is around 15 mm (assuming a 1 arc-min resolution of the eye).

Figure 33:
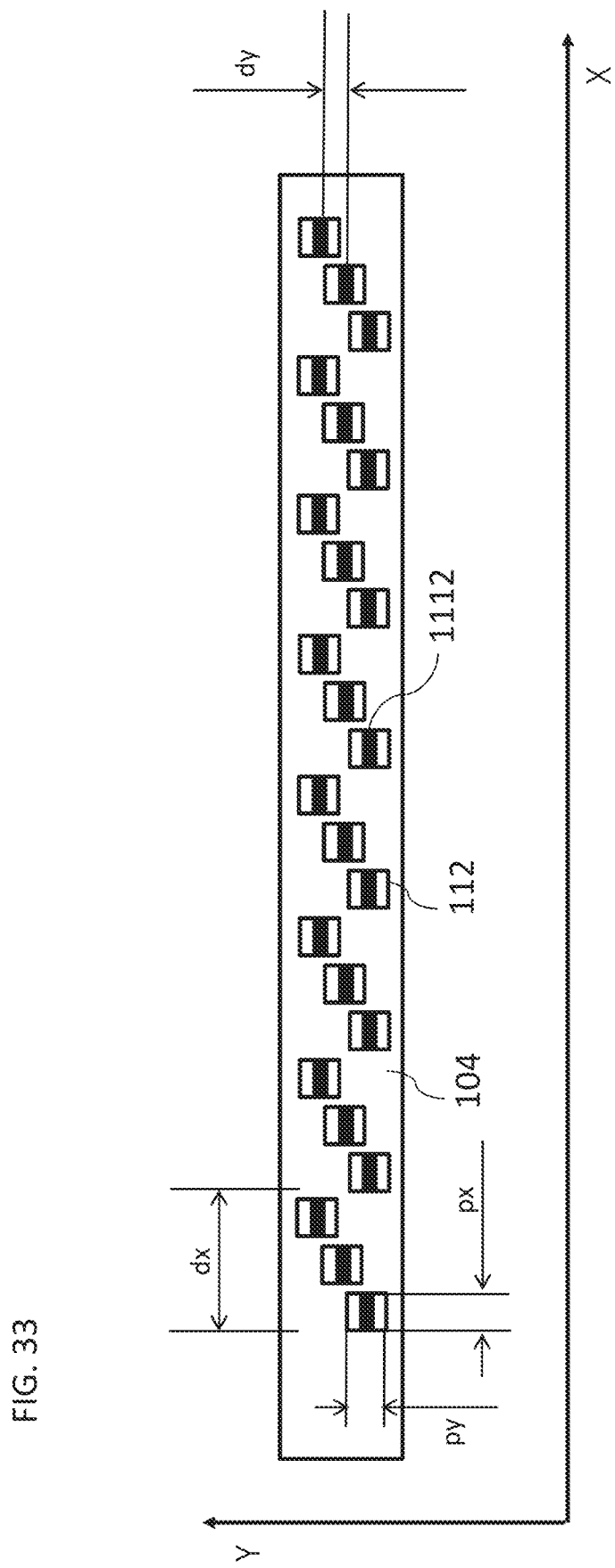
FIG. 33 shows a new pixel arrangement for an image source.

FIG. 33 shows a new pixel arrangement that can be used in SLM 104 (or a micro-LED display in some embodiments) that takes advantage of the different spatial resolutions of dx and dy by using shorter pixels 112 arranged staggered in a stair-like pattern. The y-distance (y-pitch) between the adjacent pixels centers can be made much smaller than the pixel size py. The emitting area 1112 of the pixel in y-direction can be also made smaller than py. Thus, the resolution in the y-direction will be higher than py. On the other hand, several adjacent pixels in the x-direction will not be resolved by an eye as long as they occupy a distance not larger than dx.

Assuming the pixel arrangement shown in FIG. 33 can support a y-pitch as small as one (1) micron, the minimum f1 can now be as small as around 5 mm, enabling a very compact POD.

It should be noted that the above system which is based on cylinder optics may have strong distortion. However, this can be compensated for by image processing algorithms in the display (SLM or LCOS) control chain. Image processing algorithms can also be used to compensate for color aberrations.

Variant #9: Optical System with Compensation of Aberrations of a Cylinder Mirror FIGS. 34-39B show schematic representations of another embodiment a waveguide system. In this embodiment, the waveguide system includes one or more additional components to compensate for aberrations caused by the cylindrical mirror.

By way of introduction, systems described above and shown in FIGS. 28-31 may suffer from poor image quality in the case of a large FOV and EMB. Considering light incidence angle α as shown in FIGS. 7A-7C, the aberration caused by lens 5 becomes larger as angle α increases or the beam becomes wider in the XZ plane. FIG. 34 shows a series of graphs illustrating the qualitative behavior of this aberration, denoted "ey", as a function of the position along the x-axis ("px", or x-coordinate in the pupil) as angle α increases.

Figure 39B:
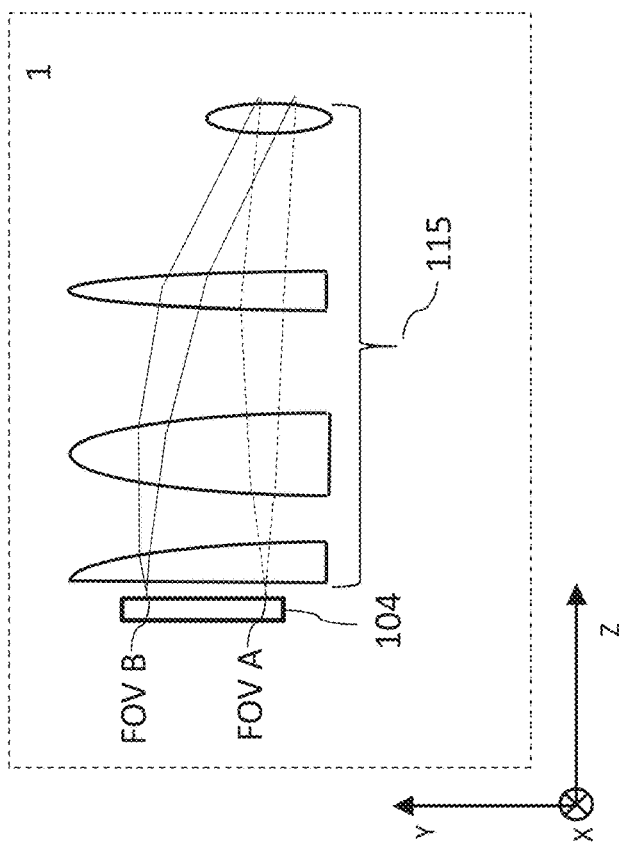
FIG. 39B shows a schematic representation of an embodiment of a waveguide system including refractive components in the POD.

Referring now to FIGS. 35A-35B, illustrating the problem described above, consider a beam parallel in the YZ plane and divergent in the XZ plane, incident on a planar refractive interface at an angle β as shown in FIG. 39B. The beam is represented by the two rays, R1 and R2. FIGS. 35A-35B assume an interface between media with refractive indices n1 and n2, where n2>n1. After refraction, the beam is no longer parallel in the YZ plane. The larger the angle β, the larger is the aberration introduced in the beam in the y-direction after refraction. Furthermore, the larger the difference between n1 and n2, the larger the aberration.

FIGS. 36A-36B demonstrate the behavior described above when a wedge prism is introduced between the mediums of FIGS. 35A and 35B. In this case, a beam parallel in the YZ plane and divergent in the XZ plane propagates through three media, including a center wedge prism, having refractive indices n1, n2, n3, respectively, where n2 is smaller than both n1 and n3. The wedge-shaped medium with refractive index n2 shown in FIG. 36B introduces a similar aberration as a refractive interface. The larger the wedge angle γ, or the larger the difference between n1 and n2, as well as between n3 and n2, the larger the aberration introduced in the y-direction by the wedge.

However, it should be noted that the maximum refractive index difference of the available optical glasses suitable for visible spectral range is about 0.5, which is too small for the refractive interface shown in FIGS. 35A-35B to create an aberration large enough to balance the aberration caused by a cylinder mirror such as lens 5 in the waveguide systems disclosed herein. One possible solution is to increase the incidence angle β, thereby increasing the aberration in the y-direction. However, a high angle may result in additional, non-desirable aberrations in the beam.

Figure 37A:
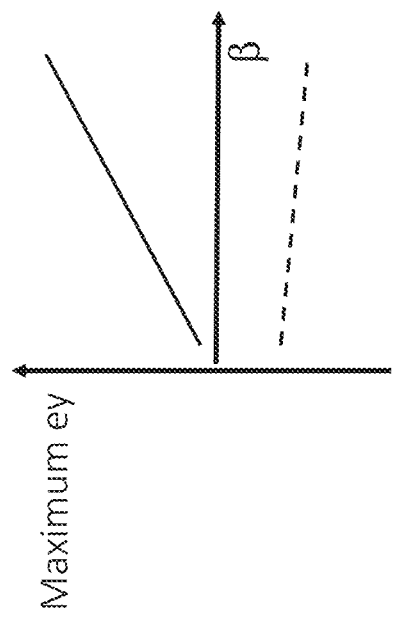
FIG. 37A shows a graph illustrating the maximum y-aberration introduced by a wedge prism relative to a cylinder mirror.
Figure 37B:
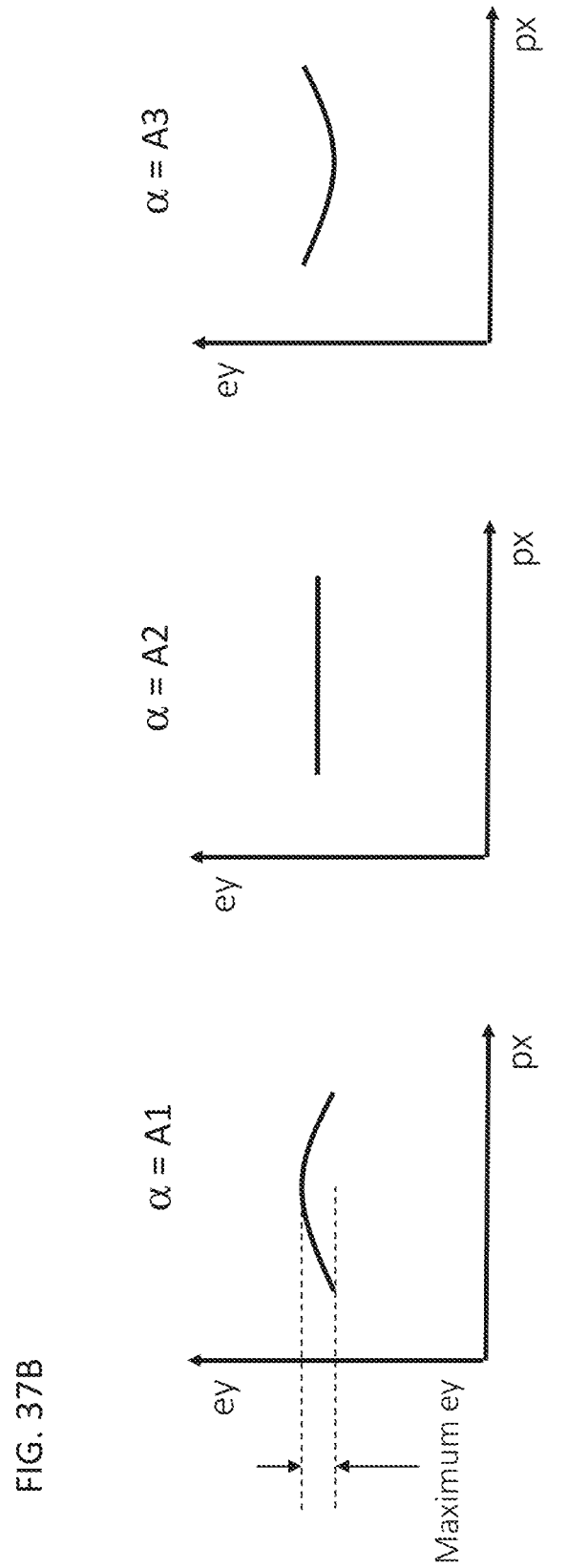
FIG. 37B shows a series of graphs illustrating the maximum aberration for different FOVs.

On the other hand, if air is used as the medium instead of the wedge prism, the air enables a high refractive index difference and a large y-aberration. The magnitude of this aberration weakly depends on the incident angle β. The maximum y-aberration introduced by a wedge is shown qualitatively in FIG. 37A by a dashed line. Conversely, the cylinder mirror aberration has a strong dependence on the incidence angle, as shown in FIG. 37A by a solid line. As a result, if a wedge is used to compensate for the aberration for a central FOV as shown in FIG. 37B for α=A2, the aberrations for the edge FOVs A1 and A3 will be approximately equal and opposite in sign.

Accordingly, a wedge element as shown in FIGS. 36A-36B can reduce aberrations of a cylinder mirror by a factor of approximately two (2). FIGS. 38A-38B show schematically a side and top view of an embodiment of a waveguide system that includes a wedge 113 positioned between POD 1 and waveguide 2. Wedge 113 couples-in light from the POD to the waveguide. In this case, the waveguide aperture stop should be located behind the wedge 113. The system can further include a polarizer and a quarter waveplate similar to systems described above with reference to FIGS. 12A-13B and 29A-29B. The surfaces 113$a$ and 113$b$ of wedge 113 can optionally have optical power in one or two dimensions in order to compensate optics aberrations of the POD 1 and achieve a better image quality.

In a system where the beams that belong to different FOVs are separated, and each such a beam passes through a wedge with a different angle γ, it would be possible to introduce different y-aberrations into each beam, thus perfectly compensating the aberration of a cylinder mirror over the complete FOV. The separation of the beams that belong to different FOVs occurs inside the POD. Thus, aberration compensation can be achieved using refractive optical elements within the POD.

Figure 39A:
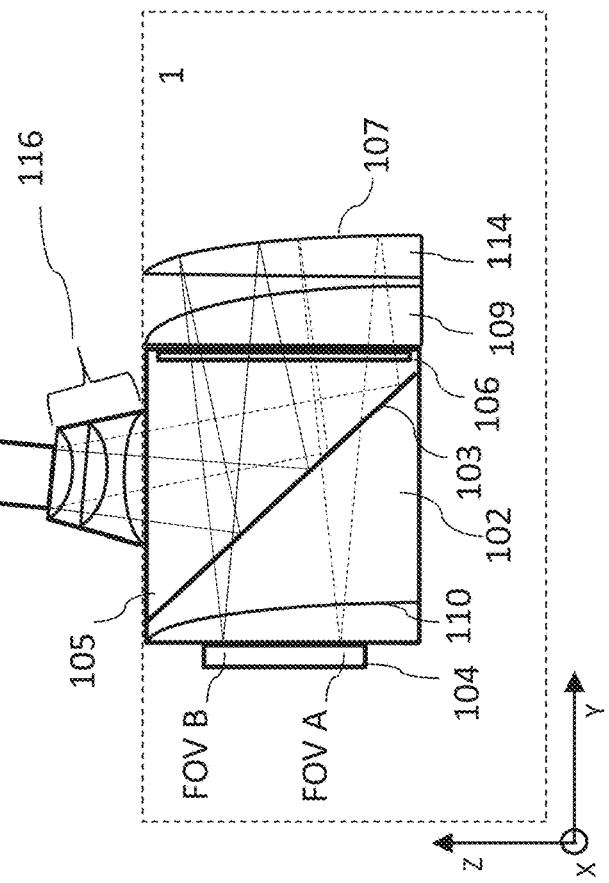
FIG. 39A shows a schematic representation of an embodiment of a waveguide system including additional optical elements in the POD.

Thus, FIG. 39A shows a system in which POD 1 includes prisms 102 and 105 separated by a polarization beam-splitter 103, a quarter waveplate (QWP) 106 and cylinder optical refractive elements 109, 110, 114 and 116. The QWP 106 can be located between the prism 105 and the element 109, or can be located inside the element 114. The element 114 has a reflecting surface 107. The gap between the elements 109 and 114 is filled with air or a material with a refractive index different from the index of elements 109 and 114. In the latter case, the elements 109 and 114 will form a group of cemented lenses. The optical refractive elements 109, 110, 114 and 116 can include cemented glass elements or may include elements separated by air.

In one embodiment, some or all of the optical elements 109, 110, 114 and 116 can be implemented using volume Bragg diffractive lenses. Volume Bragg gratings enable all diffracted energy to be directed into a single diffraction order, and the diffraction efficiency of such gratings is very sensitive to wavelength. That is why, a conventional reflective or refractive interface can be replaced by a combination of three volume Bragg gratings, each optimized for blue, red and white components of spectrum.

In the system shown in FIG. 39A, the refractive interfaces effectively work as wedges of different angles γ for different FOVs, such as rays that belong to FOV A and FOV B that are emitted from image source 104. The refractive interfaces of elements 109, 110, 114 and 116 may in some embodiments have a cylinder, aspheric or free-form shape, or any combination of shape types. The number and shape of the refractive components shown in FIG. 43A are merely non-limiting examples of the system described herein.

In some embodiments, POD 1 provides beams divergent in the x-direction, and including introduced aberrations opposite to that of lens 5 (FIG. 28) in the y-direction. Alternatively, the POD can include refractive components 115 only and produce the same desired aberration, as shown in FIG. 39B.

It should be noted that the components with optical power in the POD (namely components 107, 114, 109, 110 and 115) are essentially cylindrical, meaning they do not have optical power in the x-direction. In principle, however, those components could in fact have some optical power in the x-direction, particularly if it improves the overall image quality.

It should be noted that the aberration caused by a cylinder mirror is similar to a coma aberration in a conventional optical system. Indeed, it becomes apparent if one considers rays that pass through a line in the exit pupil which is orthogonal to the tangential plane of a system with coma. In theory, the POD module can balance the cylinder mirror aberration if it has a coma aberration of a different sign as compared to the aberration of a cylinder mirror. However, such a POD system with a coma will likely introduce additional aberrations too, such as a spherical aberration. A POD design should attempt to balance all aberrations except coma aberration.

For example, referring back to FIG. 39A, note that there exists a group of optical elements 116 with optical power situated between the POD and the waveguide. This group of elements can include one or more elements that serve to improve the image quality, for example, by compensating a spherical aberration of the POD. The group of elements 116 can include cylinder lenses or may have lenses of a more complex shape for a more efficient compensation of aberrations. The gaps between the elements in the group can be filled with air or an optical material with a different refractive index. In the latter case, the group 116 will consist of several cemented lenses.

In one particularly preferred embodiment, elements 109 and 107 work in an off-axis mode, introducing an aberration dependent on the FOV. The elements 116 work in an on-axis mode, compensating aberrations which do not depend on the FOV or weakly depend on the FOV as compared to the aberration introduced by lens 5.

In other embodiments, it is also possible that at least some of the elements in the group 116 work in an off-axis mode.

In yet another embodiment, at least some of the elements 107, 109, 110 and 114 can work in an on-axis mode, while some of the elements in the group 116 can work in an off-axis mode.

The embodiments described above may therefore be used to achieve 2D FOV expansion of the image injected into the waveguide while improving the quality of the image shown to a viewer relative to the image quality of the prior art optical systems.

Additionally, the embodiments described above can accommodate a more compact projection optics module relative to the prior art systems.

It will be appreciated that the above descriptions are intended only to serve as examples, and that many other embodiments are possible within the scope of the present invention as defined in the appended claims.

What is claimed is:

1. A display for providing an image to an eye of an observer, the display comprising:
   (a) an image generator providing image illumination corresponding to the image;
   (b) a substrate having mutually-parallel first and second major external surfaces; (b)
   (c) an intermediate optical arrangement configured for directing the image illumination from said image generator so as to propagate within said substrate in a first in-plane direction by internal reflection from said first and second major external surfaces, said intermediate optical arrangement including at least one astigmatic optical element such that the image illumination propagating within said substrate is collimated in a plane perpendicular to said first major external surface and is non-collimated in a plane parallel to said first major external surface;

(d) a reflective optical arrangement having cylindrical optical power, said reflective optical arrangement being integrated with said substrate for reflecting at least part of the image illumination so as to propagate in a second in-plane direction by internal reflection from said first and second major external surfaces, said image illumination after reflection from said reflective optical arrangement being collimated image illumination collimated both in a plane perpendicular to, and in a plane parallel to, said first major external surface; and (e) a coupling-out arrangement for coupling out at least part of said collimated image illumination towards an eye of an observer, wherein said reflective optical arrangement has a characteristic aberration, and wherein said intermediate optical arrangement includes at least one element deployed to generate a corrective optical aberration that at least partially cancels out with said characteristic aberration of said reflective optical arrangement.

2. The display of claim 1, wherein said reflective optical arrangement includes a cylindrical mirror integrated with an edge of said substrate, said cylindrical mirror having a cylinder axis perpendicular to said first major external surface.

3. The display of claim 1, wherein said intermediate optical arrangement is configured such that the image illumination propagating within said substrate is convergent in a plane parallel to said first major external surface so as to converge towards a focal locus within said substrate and then diverge before reaching said reflective optical arrangement.

4. The display of claim 3, further comprising an etendue optical expander integrated with said substrate at said focal locus.

5. The display of claim 4, wherein said etendue optical expander is polarization selective.

6. The display of claim 4, wherein said etendue optical expander is a one-dimensional etendue optical expander configured to expand the image illumination in a plane parallel to said first major external surface without broadening the image illumination in a plane perpendicular to said first major external surface.

7. The display of claim 4, wherein said etendue optical expander comprises an array of cylindrical microlenses.

8. The display of claim 3, wherein said intermediate optical arrangement includes at least one astigmatic optical element having an effective axis of cylindrical optical power, said effective axis of cylindrical optical power being optically parallel to a cylinder axis of said reflective optical arrangement.

9. The display of claim 8, wherein said astigmatic optical element is integrated with said substrate.

10. The display of claim 9, wherein said astigmatic optical element comprises a cylindrical refractive lens integrated with said substrate.

11. The display of claim 9, wherein said astigmatic optical element comprises a cylindrical reflective lens integrated with said substrate.

12. The display of claim 9, wherein said astigmatic optical element comprises a diffractive optical element with cylindrical optical power integrated with said substrate.

13. The display of claim 12, wherein said reflective optical arrangement comprises a diffractive optical element with cylindrical optical power integrated with said substrate.

14. The display of claim 8, wherein said astigmatic optical element is external to said substrate.

15. The display of claim 14, wherein said astigmatic optical element comprises a refractive lens with cylindrical optical power.

16. The display of claim 14, wherein said astigmatic optical element comprises a reflective lens with cylindrical optical power.

17. The display of claim 14, wherein said astigmatic optical element comprises a diffractive optical element with cylindrical optical power.

18. The display of claim 1, wherein said intermediate optical arrangement is configured such that the image illumination propagating within said substrate towards said reflective optical arrangement is divergent in a plane parallel to said first major external surface.

19. The display of claim 18, wherein said image generator comprises an elongated spatial light modulator having a width and a length, said length being at least five times greater than said width, said spatial light modulator being deployed with said length aligned parallel to said first major external surface.

20. The display of claim 19, wherein said intermediate optical arrangement comprises a polarizing beam splitter (PBS) prism optically coupled to said substrate, said spatial light modulator being optically coupled to a face of said PBS prism.

21. The display of claim 19, wherein said spatial light modulator has an effective pixel area which is oblong, having a first pixel pitch parallel to said length and a second pixel pitch smaller than said first pixel pitch parallel to said width.

22. The display of claim 21, wherein each physical pixel element for said spatial light modulator is smaller than said first pixel pitch and larger than said second pixel pitch, a plurality of said physical pixel elements being staggered within each first pixel pitch.

* * * * *

UNITED STATES PATENT AND TRADEMARK OFFICE
CERTIFICATE OF CORRECTION

PATENT NO. : 12,105,279 B2
APPLICATION NO. : 17/427963
DATED : October 1, 2024
INVENTOR(S) : Shimon Grabarnik et al.

Page 1 of 1

It is certified that error appears in the above-identified patent and that said Letters Patent is hereby corrected as shown below:

On the Title Page

Related U.S. Application Data item (60) insert:
--Provisional application No. 62/924,724, filed on Oct. 23, 2019.
Provisional application No. 63/019,357, filed on May 03, 2020.--

In the Claims

Column 22
Claim 1, Line 56:
Change:
"(b) a substrate having mutually-parallel first and second major external surfaces;(b)"
To:
"(b) a substrate having mutually-parallel first and second major external surfaces;"

Signed and Sealed this
Twenty-fourth Day of June, 2025

Coke Morgan Stewart
*Acting Director of the United States Patent and Trademark Office*